United States Patent
Kim et al.

(10) Patent No.: US 10,782,740 B2
(45) Date of Patent: Sep. 22, 2020

(54) DISPLAY APPARATUS

(71) Applicant: LG Display Co., Ltd., Seoul (KR)

(72) Inventors: Taehyung Kim, Paju-si (KR); GeunChang Park, Paju-si (KR); ChounSung Kang, Paju-si (KR); Mi-Na Shin, Paju-si (KR); SunBok Song, Paju-si (KR); SeungJun Koo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/385,821

(22) Filed: Apr. 16, 2019

(65) Prior Publication Data

US 2019/0324501 A1 Oct. 24, 2019

(30) Foreign Application Priority Data

Apr. 20, 2018 (KR) .................. 10-2018-0046111

(51) Int. Cl.
*G06F 1/16* (2006.01)
*G09F 9/30* (2006.01)
*H05K 5/00* (2006.01)

(52) U.S. Cl.
CPC .......... *G06F 1/1652* (2013.01); *G06F 1/1601* (2013.01); *G06F 1/1675* (2013.01); *G06F 1/1688* (2013.01); *G09F 9/301* (2013.01); *H05K 5/0017* (2013.01)

(58) Field of Classification Search
CPC ............................. G06F 1/1652; G06F 1/1688
See application file for complete search history.

(56) References Cited

U.S. PATENT DOCUMENTS

| | | | | |
|---|---|---|---|---|
| 6,771,232 B2* | 8/2004 | Fujieda | ................ | G06F 1/1615 345/30 |
| 7,558,057 B1* | 7/2009 | Naksen | ................ | G06F 1/1613 361/679.3 |
| 8,009,422 B2* | 8/2011 | Misawa | ............ | G02F 1/133305 345/156 |
| 8,184,369 B2* | 5/2012 | Kuroi | .................... | G03B 21/58 359/443 |
| 8,861,755 B2* | 10/2014 | Ando | .................. | H04R 17/005 381/190 |
| 9,337,434 B2* | 5/2016 | Lindblad | ............. | H01L 51/0097 |
| 10,019,036 B2* | 7/2018 | Sun | ........................ | G06F 1/1643 |
| 10,257,945 B2* | 4/2019 | Kim | ...................... | G06F 1/1652 |

(Continued)

FOREIGN PATENT DOCUMENTS

TW    201643096 A    12/2016
WO    2010/106683 A1    9/2010

*Primary Examiner* — Adrian S Wilson
(74) *Attorney, Agent, or Firm* — Morgan, Lewis & Bockius LLP

(57) ABSTRACT

A display apparatus includes a display panel including a plurality of pixels and configured to display an image; a housing module including a roller therein such that the display panel is configured to be wound on the roller to be housed in the housing module or unwound from the roller to extend from the housing module; a rolling module including a structure connected to the display panel and configured to wind or unwind the display panel according to a folding or unfolding of the structure; and a vibration device on the structure, the vibration device configured to vibrate the display panel in an unwound state.

30 Claims, 9 Drawing Sheets

(56) References Cited

U.S. PATENT DOCUMENTS

| | | | |
|---|---|---|---|
| 2004/0183958 A1* | 9/2004 | Akiyama | G02F 1/133305 |
| | | | 349/58 |
| 2005/0041012 A1* | 2/2005 | Daniel | G06F 1/1601 |
| | | | 345/156 |
| 2005/0254674 A1* | 11/2005 | Huang | G06F 1/1626 |
| | | | 381/190 |
| 2009/0302176 A1* | 12/2009 | Kuroi | F16M 11/38 |
| | | | 248/176.3 |
| 2011/0132557 A1 | 6/2011 | Kuroi et al. | |
| 2012/0243719 A1* | 9/2012 | Franklin | G06F 1/1652 |
| | | | 381/333 |
| 2013/0265221 A1* | 10/2013 | Lee | G06F 3/01 |
| | | | 345/156 |
| 2014/0241551 A1* | 8/2014 | Kim | H04R 1/02 |
| | | | 381/306 |
| 2015/0341714 A1* | 11/2015 | Ahn | G06F 1/1688 |
| | | | 381/333 |
| 2016/0363960 A1 | 12/2016 | Park et al. | |
| 2017/0161868 A1 | 6/2017 | Kim et al. | |
| 2017/0367198 A1* | 12/2017 | Park | H01L 51/5237 |

* cited by examiner

DISPLAY APPARATUS

CROSS-REFERENCE TO RELATED APPLICATIONS

This application claims the benefit of the Korean Patent Application No. 10-2018-0046111 filed on Apr. 20, 2018, which is hereby incorporated by reference as if fully set forth herein.

BACKGROUND

Technical Field

The present disclosure relates to a display apparatus.

Discussion of the Related Art

Generally, display apparatuses are widely used as display screens of various products, such as televisions (TVs), notebook computers, monitors, and portable electronic devices. Recently, in display apparatuses, organic light emitting display apparatuses, liquid crystal display (LCD) apparatuses, and electrophoresis display apparatuses have been made thin, and thus, research and development for implementing the display apparatuses as flexible display apparatuses have been done. Particularly, research and development on rollable display apparatuses including a flexible display panel capable of being wound like a roll are being actively done.

In rollable display apparatuses, because sound output from a sound device travels rearward or downward with respect to a housing module, sound quality is degraded due to interference between sound reflected from a wall or the ground, and therefore, it is difficult to transfer an accurate sound and an immersion experience of a viewer is reduced.

SUMMARY

Accordingly, embodiments of the present disclosure are directed to a display apparatus that substantially obviates one or more of the problems due to limitations and disadvantages of the related art.

An aspect of the present disclosure is to provide a display apparatus for outputting a sound in a forward direction to a front of a display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other advantages and in accordance with the purpose of the disclosure, as embodied and broadly described herein, a display apparatus comprises a display panel including a plurality of pixels and configured to display an image; a housing module including a roller therein such that the display panel is configured to be wound on the roller to be housed in the housing module or unwound from the roller to extend from the housing module; a rolling module including a structure connected to the display panel and configured to wind or unwind the display panel according to a folding or unfolding of the structure; and a vibration device on the structure, the vibration device configured to vibrate the display panel when the display device in an unwound state. In this application, the terms "rolling", "rolling up" and "winding" may be synonymously used. Likewise, the terms "unrolling" and unwinding" may be synonymously used.

In another aspect, a display apparatus comprises a display panel including a plurality of pixels and configured to display an image; a housing module for accommodating the display panel in a rolled-up state, the housing module including a roller part configured to allow the display panel to be rolled-up thereon; a rolling module including at least one structure connected to the display panel and configured to unroll the display panel according to unfolding of the structure; and a vibration device on the at least one structure, the vibration device configured to vibrate the display panel in an unrolled state, wherein the vibration device includes a vibration generating device and a plurality of magnetic plates on the vibration generating device.

The display apparatus according to an embodiment of the present disclosure may output a panel vibration sound, generated by a vibration of the display panel, in a forward direction from a front of the display apparatus, and thus, may provide a more accurate sound to a viewer, and may increase an immersion experience of the viewer.

Moreover, in the display apparatus according to an embodiment of the present disclosure, the vibration device may move along with unfolding of the display panel, and thus, a panel vibration sound generated by a vibration of the unfolded display panel may be output in a forward region from front of the display apparatus in a full screen mode or a local screen mode of the display panel.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
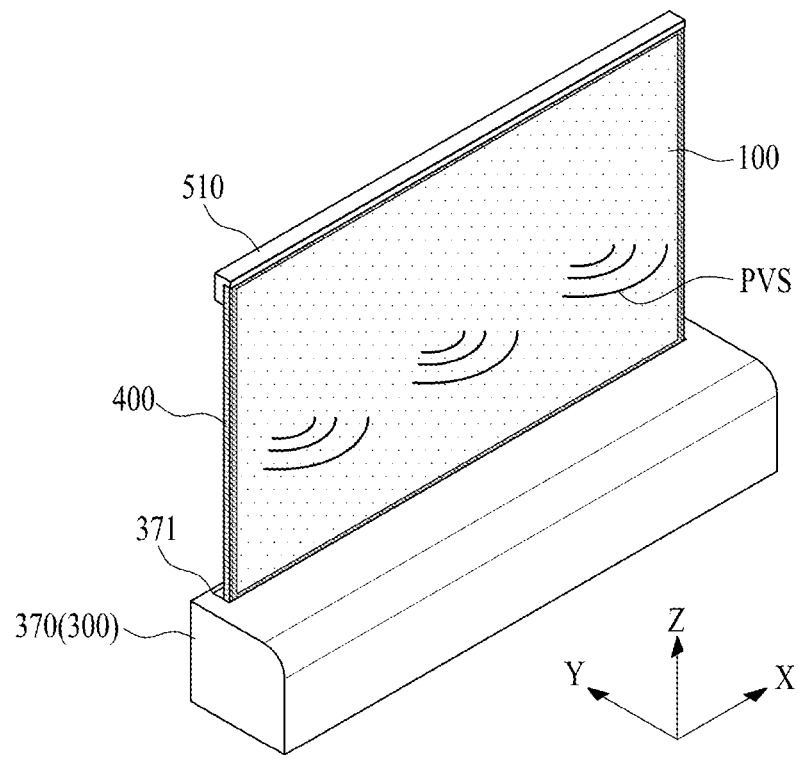
FIG. 1 illustrates a display panel unloaded from a housing module in a display apparatus according to an embodiment of the present disclosure.

Reference will now be made in detail to embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Unless otherwise described, like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms like "first," "second," etc., may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" encompasses the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship. Hereinafter, embodiments of a display apparatus according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the important point of the present disclosure, the detailed description will be omitted.

A vibration device for generating a sound on the basis of a vibration of a display panel may be attached on a display panel. However, the inventors have recognized that, when the vibration device is completely attached on the display panel, it is difficult to move or attach/detach the vibration device, and due to this, it is difficult to implement a flexible display apparatus. Therefore, the inventors have performed several experiments for implementing an attachable/detachable vibration device capable of being applied to the flexible display apparatus. Through the several experiments, the inventors have invented a display apparatus including a vibration device having a new structure, and the display apparatus will be described below.

Figure 2:
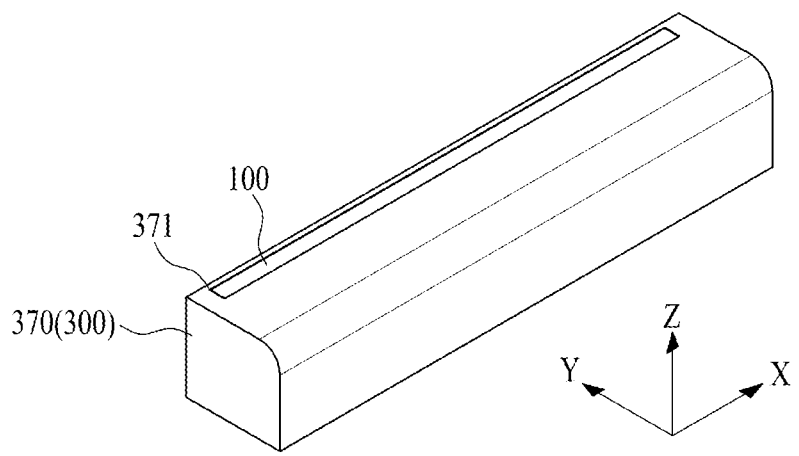
FIG. 2 illustrates a state where the display panel illustrated in FIG. 1 is inserted into the housing module.
Figure 3:
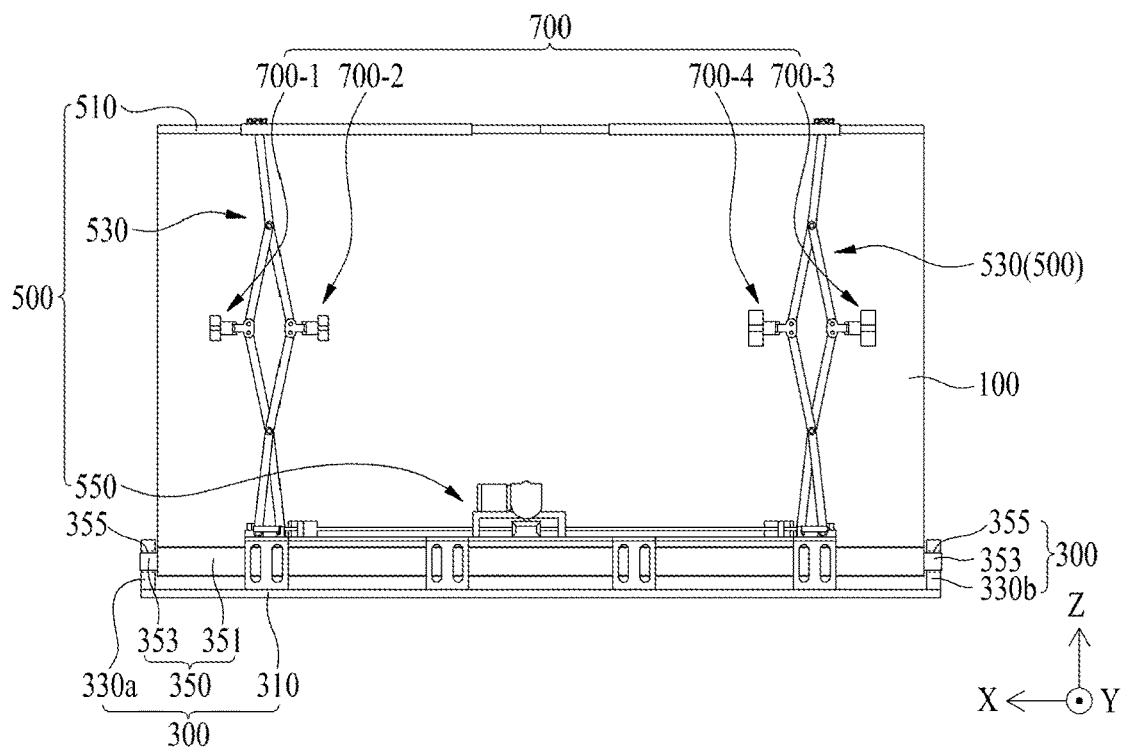
FIG. 3 illustrates a rolling module and a vibration device in a display apparatus according to an embodiment of the present disclosure.

FIG. 1 illustrates a display panel unloaded from a housing module, in a display apparatus according to an embodiment of the present disclosure. FIG. 2 illustrates a state where the display panel illustrated in FIG. 1 is inserted into the housing module. FIG. 3 illustrates a rolling module and a vibration device in a display apparatus according to an embodiment of the present disclosure.

With reference to FIGS. 1 to 3, the display apparatus according to an embodiment of the present disclosure may include a display panel 100, a housing module 300, a rolling module 500, and a vibration device 700. Here, the display apparatus may be a rollable display apparatus, and the vibration device 700 may be a panel vibration device.

The rollable display apparatus may be an apparatus including a display panel capable of being rolled or unrolled. In a case where a user uses the rollable display apparatus, the display panel should be maintained in an unfolded state. Therefore, the inventors have recognized that a rolling module for maintaining an unfolded state of the display panel is needed. Accordingly, in a case where a user uses the rollable display apparatus, the user may easily load (or roll) or unload (or unroll) the display panel using the rolling module in order to maintain a flat state of the display panel.

The display panel 100 may include a plurality of pixels configured to display an image. The display panel 100 may be wound (or loaded) into the housing module 300 according to driving of the rolling module 500, or may be unwound (or unloaded) from the inside of the housing module 300 and may be unfolded in a flat shape. The display panel 100 may display a two-dimensional (2D) image or a three-dimensional (3D) image including a still image or a moving image in a state where all or a portion of a display area (or a screen) is unfolded in a flat shape. Also, the display area of the display panel 100 unfolded in a flat shape may vibrate by the vibration device 700 to output a panel vibration sound PVS to a forward region where a viewer is located. The wound state of the display panel may also be denoted as a rolled-up state, and vice versa. Likewise, the unwound state of the display panel and the unrolled state of the display panel are to be understood synonymously.

For example, the display area of the unfolded display panel 100 may be configured as a panel speaker (or a vibration plate) which vibrates based on a vibration of the vibration device 700 to output sound. As another example, the display area of the unfolded display panel 100 may display an image using the pixels, and simultaneously, may vibrate based on the vibration of the vibration device 700 to output the panel vibration sound PVS. A panel vibration area of the display panel 100 vibrating by the vibration device 700 may be all of the display area or some portion of the display area and may be controlled based on a selection of a user (or a viewer). Accordingly, the display apparatus according to an embodiment of the present disclosure may output the panel vibration sound PVS of various sound bands, based on a size of the panel vibration area.

The display apparatus according to an embodiment may be applied to televisions (TVs), wallpaper devices, signage devices, game devices, notebook computers, monitors, home appliances, lighting devices, etc. Also, the display apparatus according to an embodiment may be applied to portable display apparatuses and electronic devices. However, embodiments are not limited to these examples of the display apparatus.

The display panel 100 according to an embodiment may be a flexible display panel. For example, the display panel 100 may be a flexible organic light emitting display panel, a flexible electrophoresis display panel, a flexible liquid crystal display panel, a flexible electro wetting display panel, a flexible micro light emitting diode display panel, or a flexible quantum dot display panel, which each uses a flexible substrate, but is not limited thereto. Also, the display panel 100 may have a tetragonal shape or a rectangular shape, but is not limited thereto. For example, the display panel 100 may have a circular shape. Hereinafter, for convenience of explanation, an instance where the display panel 100 is a flexible organic light emitting display panel and has a rectangular shape will be described as an example, but the present disclosure is not limited thereto.

The housing module 300 may be as a main body case of the display apparatus. The housing module 300 may support the rolling module 500 and may be connected to a lower portion of the display panel 100. The housing module 300 according to an embodiment may include a housing plate 310, a pair of roller brackets 330a and 330b, a roller part 350, and a housing cover 370. The housing plate 310 may be disposed on a bottom of the housing module 300 and may support the rolling module 500.

The pair of roller brackets 330a and 330b may be disposed on both peripheries of the housing plate 310 with respect to a first direction X and may rotatably support the roller part 350. Here, the first direction X may be a widthwise direction (or a long-side lengthwise direction) of the display panel 100.

The roller part 350 may be rotatably disposed between the pair of roller brackets 330a and 330b and may interlink with the driving of the rolling module 500 to wind or unwind the display panel 100. The roller part 350 according to an embodiment may include a rolling roller 351 that is connected to a lower portion of the display panel 100 and a pair of roller shafts 353 that are disposed on both ends or sides of the rolling roller 351 and are rotatably disposed on the pair of roller brackets 330a and 330b.

The rolling roller 351 may have a cylindrical shape, but is not limited thereto and may have various shapes that enable the display panel 100 to be wound. The pair of roller shafts 353 may be rotatably disposed in the pair of roller brackets 330a and 330b through bearings 355 (for example, rolling bearings), respectively.

The roller part 350 may further include an elastic member, such as a spiral spring. One end of the elastic member may be fixed to the roller shaft 353, and the other end may be fixed to an inner surface of the rolling roller 351. The spiral spring may be disposed in the rolling roller 351 or in each of the pair of roller brackets 330a and 330b. The elastic member may be compressed when the display panel 100 is unwound around the rolling roller 351 and may provide the rolling roller 351 with a rotational force based on a compressive restoring force for winding the display panel 100, thereby decreasing a load of the rolling module 500 when winding the display panel 100. Accordingly, the display panel 100 may be wound along an outer circumference of the rolling roller 351, based on unwinding driving of the rolling module 500 and a rotational force based on a compressive restoring force of the spiral spring.

The housing cover 370 may cover the pair of roller brackets 330a and 330b and the roller part 350 disposed on the housing plate 310, thereby preventing the housing plate 310, the pair of roller brackets 330a and 330b, and the roller part 350 from being externally exposed. The housing cover 370 may include a panel entrance 371 through which the display panel 100 moves in or out.

The rolling module 500 may be disposed in the housing module 300, and as the structure 530 coupled to an upper portion of the display panel 100 is folded or unfolded, the display panel 100 may be wound around or unwound from the roller part 350 of the housing module 300. The rolling module 500 may support the vibration device 700 (for example, vibration devices 700-1, 700-2, 700-3 and 700-4 shown in FIG. 3), thereby allowing the vibration device 700 to contact a rear surface of the display panel 100 which is unfolded in a flat shape. The rolling module 500 according to an embodiment may include a supporting frame 510, a structure 530, and a driver 550.

The supporting frame 510 may be disposed on the upper portion of the display panel 100. The supporting frame 510 according to an embodiment may be disposed to cover a periphery portion of an upper portion including a front periphery of an upper portion, an upper portion, and a rear periphery of an upper portion of the display panel 100.

The structure 530 may be connected to the supporting frame 510 to support an upper portion of the display panel 100, and based on driving of the driver 550, the structure 530 may be folded or unfolded to allow the display panel 100 to be wound around or unwound from the rolling roller 351 of the roller part 350. For example, the structure 530 may be connected between the supporting frame 510 and the driver 550, and based on driving of the driver 550, the structure 530 may be folded or unfolded in a lengthwise direction (or a short-side lengthwise direction) Z of the display panel 100, thereby moving upward and downward the display panel 100. The display panel 100 may move upward and downward based on folding or unfolding of at least one structure 530 connected between the supporting frame 510 and the driver 550, and thus, may be wound around or unwound from the rolling roller 351 of the roller part 350.

The structure 530 according to an embodiment may include a plurality of links which are rotatably connected to a plurality of link connection parts, respectively, and rotatably intersect one another in an X-shape using a link hinge. The link connection parts of the structure 530 may support the vibration device 700. The structure 530 may be referred to as a retractable structure (or a retractable unit) or a pantograph. Here, the vibration device 700 may not be connected to the link connection parts of the structure 530 and may be supported by at least one of the plurality of links. In this case, when the plurality of links intersecting one another in an X-shape are folded, the vibration device 700 may be damaged by the folding of the links, and thus, may be connected to the link connection parts of the structure 530 which rotatably supports the links.

The driver 550 may be disposed in the housing module 300 and may fold or unfold the structure 530. The driver 500 according to an embodiment may fold or unfold the structure 530 using a driving motor and a ball screw. For example, the driver 500 may fold the structure 500 according to panel winding driving based on a first-direction rotation of the driving motor, and thus, the display panel 100 may be wound around (or accommodated into) the rolling roller 351 of the roller part 350. Also, the driver 500 may unfold the structure 500 according to panel unwinding driving based on a second-direction rotation of the driving motor opposite to the first-direction rotation, and thus, the display panel 100 wound around the rolling roller 351 may be unwound (or unloaded), thereby unfolding all of the display panel or some portion of the display panel 100 in a flat state.

The vibration device 700 may be disposed on the structure 530 and may vibrate the display panel 100 when it is unwound from the roller part and unfolded. The display panel 100 may output the panel vibration sound PVS, generated by a vibration of the vibration device 700, to a forward region of the unfolded display area. For example, the vibration device 700 may be rotatably disposed on at least one of the plurality of link connection parts configuring the structure 530 and may directly vibrate the unfolded display panel 100.

The panel vibration area of the display panel 100 vibrating by the vibration device 700 may be changed based on folding (or unfolding) of the structure 530. For example, the vibration device 700 may be disposed on the structure 530, and thus, may move upward (or downward) along with the folding (or unfolding) of the structure 530, whereby a contact region between the vibration device 700 and the display panel 100 may be changed based on an unwinding length (or a loading length) of the display panel 100. For example, the contact region between the vibration device 700 and the display panel 100 may be adjusted to a middle region of the unwinding length (or the loading length) of the display panel 100, for a uniform vibration of the display panel 100, but is not limited thereto.

The display apparatus according to an embodiment of the present disclosure may further include a protection member 400. The protection member 400 may be disposed on each of both sides, exposed externally, of the display panel 100 and may protect both sides of the display panel 100 from an external impact. The protection member 400 may include a plurality of rotation blocks that are rolled based on rolling (winding or unwinding) of the display panel 100.

In the display apparatus according to an embodiment of the present disclosure, the display panel 100 that is unwound from the housing module 300 and unfolded may vibrate by the vibration device 700 on the structure 530 of the rolling module 500, and thus, may output the panel vibration sound PVS, generated by a vibration of the display panel 100, to a forward region of the display panel 100, thereby providing a more accurate sound to a viewer and increasing an immersion experience of the viewer.

Figure 4:
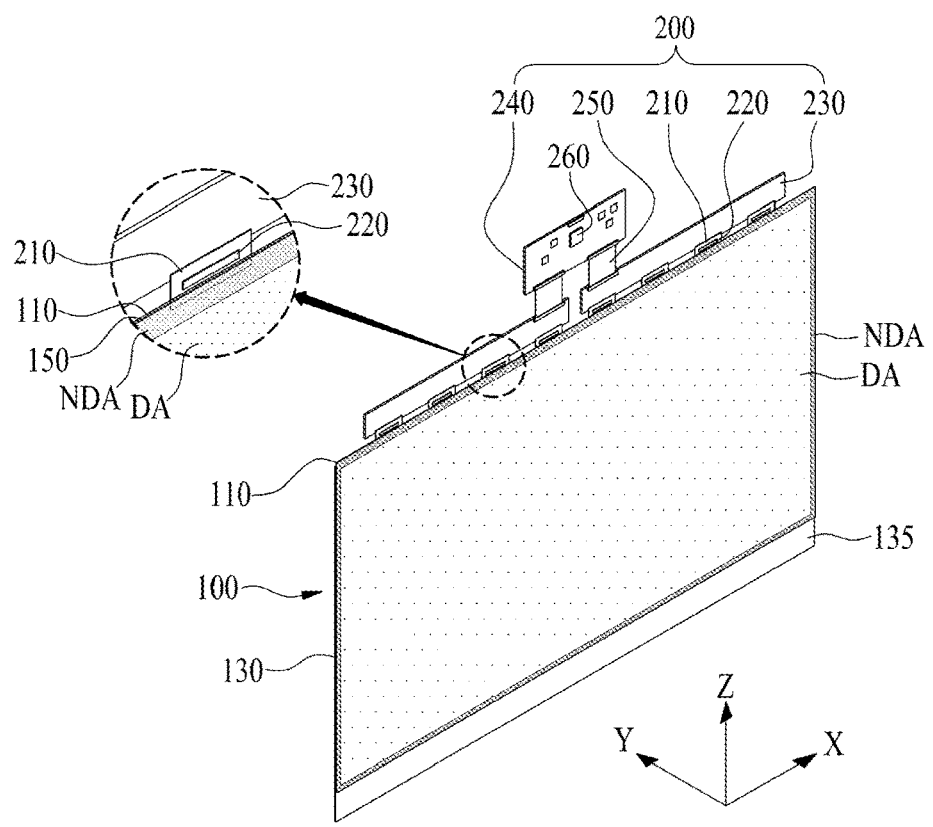
FIG. 4 illustrates a display panel and a panel driving circuit unit each illustrated in FIG. 3.

FIG. 4 illustrates the display panel and the panel driving circuit unit each illustrated in FIG. 3.

With reference to FIG. 4 in conjunction with FIG. 3, the display panel 100 according to an embodiment of the present disclosure may include a pixel array substrate 110 and an encapsulation substrate 130.

The pixel array substrate 110 may include a display area DA, a non-display area NDA, and a pad part. The display area DA may include a flexible substrate, a pixel array layer, and a passivation layer. The flexible substrate may be a flexible plastic substrate or a flexible glass substrate, but is not limited thereto. The pixel array layer may include a plurality of pixels which are provided in a pixel area by a plurality of gate lines and a plurality of data lines disposed on the flexible substrate.

Each of the plurality of pixels according to an embodiment may include a pixel driving circuit and a self-emitting device. The pixel driving circuit may allow the self-emitting device to emit light, based on a data signal supplied through a corresponding data line. The pixel driving circuit may include a driving thin film transistor (TFT) which supplies a data current, corresponding to the data signal, to the self-emitting device. The self-emitting device may emit light proportional to the amount of current supplied from the pixel driving circuit and may include an organic light emitting device layer, a quantum dot light emitting device layer, or a light emitting diode (LED) chip. Each of the plurality of pixels may have a bottom emission structure where light is output to the outside through the flexible substrate, but is not limited thereto and may have a top emission structure.

The passivation layer may be provided on the flexible substrate to surround the pixel array layer. The passivation layer may prevent oxygen or water from penetrating into the self-emitting device. The passivation layer according to an embodiment may include at least one inorganic layer. The inorganic layer may be formed of silicon nitride, aluminum nitride, zirconium nitride, titanium nitride, hafnium nitride, tantalum nitride, silicon oxide, aluminum oxide, or titanium oxide. The passivation layer according to an embodiment may further include at least one organic layer. The organic layer may be provided to have a sufficient thickness, for preventing particles from penetrating into the self-emitting device via the inorganic layer. The passivation layer may be referred to as an encapsulation layer.

The non-display area NDA may be a periphery portion of a plastic substrate surrounding the display area DA. The pad part may be provided in a first non-display area of the non-display area NDA and may be connected to the plurality of data lines disposed in the display area DA. Here, the first non-display area may be a periphery portion of an upper portion of the pixel array substrate 110 having a relatively long length.

The display panel 100 according to an embodiment of the present disclosure may further include a gate driving circuit provided in the pixel array substrate 110. The gate driving circuit may be provided in the non-display area NDA of the pixel array substrate 110. The gate driving circuit may generate a gate signal according to a gate control signal supplied from the outside and may supply the gate signal to a corresponding gate line according to a predetermined order. The gate driving circuit according to an embodiment may be provided in the non-display area NDA of the pixel array substrate along with the driving TFT. For example, the gate driving circuit may be provided in at least one of a second non-display area and a third non-display area of the pixel array substrate 110. Here, the second non-display area may be a left periphery portion of the pixel array substrate 110 having a relatively short length, and the third non-display area may be a right periphery portion of the pixel array substrate 110 parallel to the second non-display area.

The encapsulation substrate 130 may cover a front surface, other than the first non-display area, of the pixel array substrate 110. The encapsulation substrate 130 according to an embodiment may be attached on the front surface of the pixel array substrate 110 by an adhesive or a filler. The encapsulation substrate 130 may prevent oxygen or water from penetrating into the self-emitting device. The encapsulation substrate 130 according to an embodiment may have a thickness of 100 µm or less to prevent penetration of oxygen or water and enable the display panel 100 to be bent, but is not limited to thereto.

The encapsulation substrate 130 according to an embodiment may vibrate by the vibration device 700 to act as a vibration plate of a panel speaker. For example, the encapsulation substrate 130 according to an embodiment of the present disclosure may be formed of one of a magnesium (Mg) alloy material, a Mg-lithium (Li) alloy material, and an aluminum (Al) alloy material, but is not limited thereto. For example, the Mg alloy material may include at least one of Al, zinc (Zn), and manganese (Mn). The Mg alloy material may be a lightest material of metal materials usable as a vibration plate of a speaker, may have relatively high non-rigidity (stiffness/specific gravity) and relatively high vibration damping ability (ability to absorb and progressively reduce vibration), and may be good in dimension stability with respect to a variation of a temperature and the elapse of time.

Because the encapsulation substrate 130 according to an embodiment of the present disclosure may be formed of one of a Mg alloy material, a Mg—Li alloy material, and an Al alloy material, a fine sound may be realized due to a reactivity (a response time) of a fast sound based on a low density, and a sound having a whole sound band including a low sound band to a high sound band is realized based on a fast sound speed due to high non-rigidity. Also, because internal loss is large due to high vibration ability, undesired vibration does not occur, and thus, a residual sound and a reflected sound or a resonance sound may be suppressed or reduced, thereby enabling an original sound to be reproduced or generated. Also, the vibration plate may have high elasticity, and thus, a high-resolution tone may be realized or generated.

The display panel 100 according to an embodiment of the present disclosure may further include a transmissive film 150 attached on the pixel array substrate 110.

The transmissive film 150 may be attached on the front surface of the pixel array substrate 110 by a transparent adhesive layer, and thus, may protect a light output surface of the display panel 100 and may increase a rigidity of a front surface of the display panel 100. The transmissive film 150 according to an embodiment may be formed of a flexible film, and for example, may be at least one of a polyethylene terephthalate film, an antireflection film, a polarizing film, and a transmittance controllable film.

The display panel 100 according to an embodiment of the present disclosure may further include a touch panel for a user interface using a touch of a user. The touch panel may be disposed between the pixel array substrate 110 and the transmissive film 150, or may be embedded into the flexible display panel 100 through a process of manufacturing the pixel array substrate 110 on the basis of an in-cell touch type. For example, a touch electrode layer based on the in-cell touch type may include a plurality of mutually capacitive touch electrodes or self-capacitive touch electrodes. The touch electrode layer may be formed on the passivation layer through the process of manufacturing the pixel array substrate 110.

The display panel 100 according to an embodiment of the present disclosure may further include a roller connection part 135. The roller connection part 135 may connect a lower portion (or a fourth non-display area) of the display panel 100 to the roller part 350 of the housing module 300. For example, the lower portion of the display panel 100 may be connected to the rolling roller 351 of the roller part 350 through the roller connection part 135. When the whole display area DA of the display panel 100 is unfolded in a flat shape, the roller connection part 135 may prevent a lower portion of the display area DA from being covered by the housing module 300. For example, one side of the roller connection part 135 may be connected to the lower portion of the display panel 100, and the other side of the roller connection part 135 may be connected to the roller part 350. When the whole display area DA of the display panel 100 is unfolded in a flat shape, one side of the roller connection part 135 may be located inside the panel entrance 371 of the housing module 300 or on the panel entrance 371.

The roller connection part 135 according to an embodiment may include a thin flexible plate that includes one side attached on the lower portion of the display panel 100 and another side attached on the roller part 350. Here, a length of a middle portion, other than the one side and the other side, of the thin flexible plate may be equal to or longer than a length between the rolling roller 351 and the panel entrance 371 of the housing module 300. For example, the flexible plate may be formed of a plastic material or a metal material.

The roller connection part 135 according to another embodiment may be an extension portion which extends from a lower portion of the encapsulation substrate 130 so as to be attached on the roller part 350. Also, the extension portion may extend from the lower portion of the encapsulation substrate 130 to have a length which is equal to or longer than the length between the rolling roller 351 and the panel entrance 371.

The display apparatus according to an embodiment of the present disclosure may further include a driving circuit unit 200 connected to the display panel 100. The driving circuit unit 200 may drive a plurality of pixels in the display panel 100 to display an image on the display panel 100. For example, the driving circuit unit 200 may be disposed on a rear surface of an upper portion of the display panel 100 and may be covered by the supporting frame 510 of the rolling module 500. The driving circuit unit 200 according to an embodiment may include a plurality of flexible circuit films 210, a data driving integrated circuit (IC) 220, a printed circuit board (PCB) 230, and a control board 240.

Each of the plurality of flexible circuit films 210 may be attached between the pad part of the pixel array substrate 110 and the PCB 230 through a film attachment process and may be formed of a tape carrier package (TCP) or a chip on flexible board (or a chip on film) (COF).

The data driving IC 220 may be provided in plurality, and the plurality of data driving ICs 220 may be respectively mounted on the plurality of flexible circuit films 210 and may be connected to the pad part through the flexible circuit films 210. The data driving IC 220 may receive pixel-based pixel data and a data control signal supplied from the control board 240, convert the pixel-based pixel data into an analog data signal according to the data control signal, and supply the analog data signal to a corresponding data line through the pad part.

The PCB 230 may be connected to the plurality of data flexible circuit films 210. The PCB 230 may supply a driving power and signals, supplied from the control board 240, to the data driving IC 220 and the gate driving circuit so as to display an image on each of the plurality of pixels. For example, signal transmission lines and various power lines may be provided on the PCB 230. The PCB 230 may be provided as one or more, based on the number of flexible circuit films 210.

The control board 240 may be connected to the PCB 230 through a signal cable 250. A timing control circuit 260, various power circuits, and a memory device may be mounted on the control board 240.

The timing control circuit 260 may align digital video data input from a host system (or a driving system) of the display apparatus according to a pixel arrangement structure to generate pixel-based pixel data and may supply the generated pixel-based pixel data to the data driving IC 220. Also, the timing control circuit 260 may generate the data control signal and a gate control signal, based on the timing synchronization signal supplied from the host system, and thus, the timing control circuit 260 may control a driving timing of the data driving IC 220 using the data control signal and may control a driving timing of the gate driving circuit using the gate control signal. The timing control circuit 260 may be implemented as an IC or a semiconductor chip and may be mounted on the control board 240 or the PCB 230.

Figure 5:
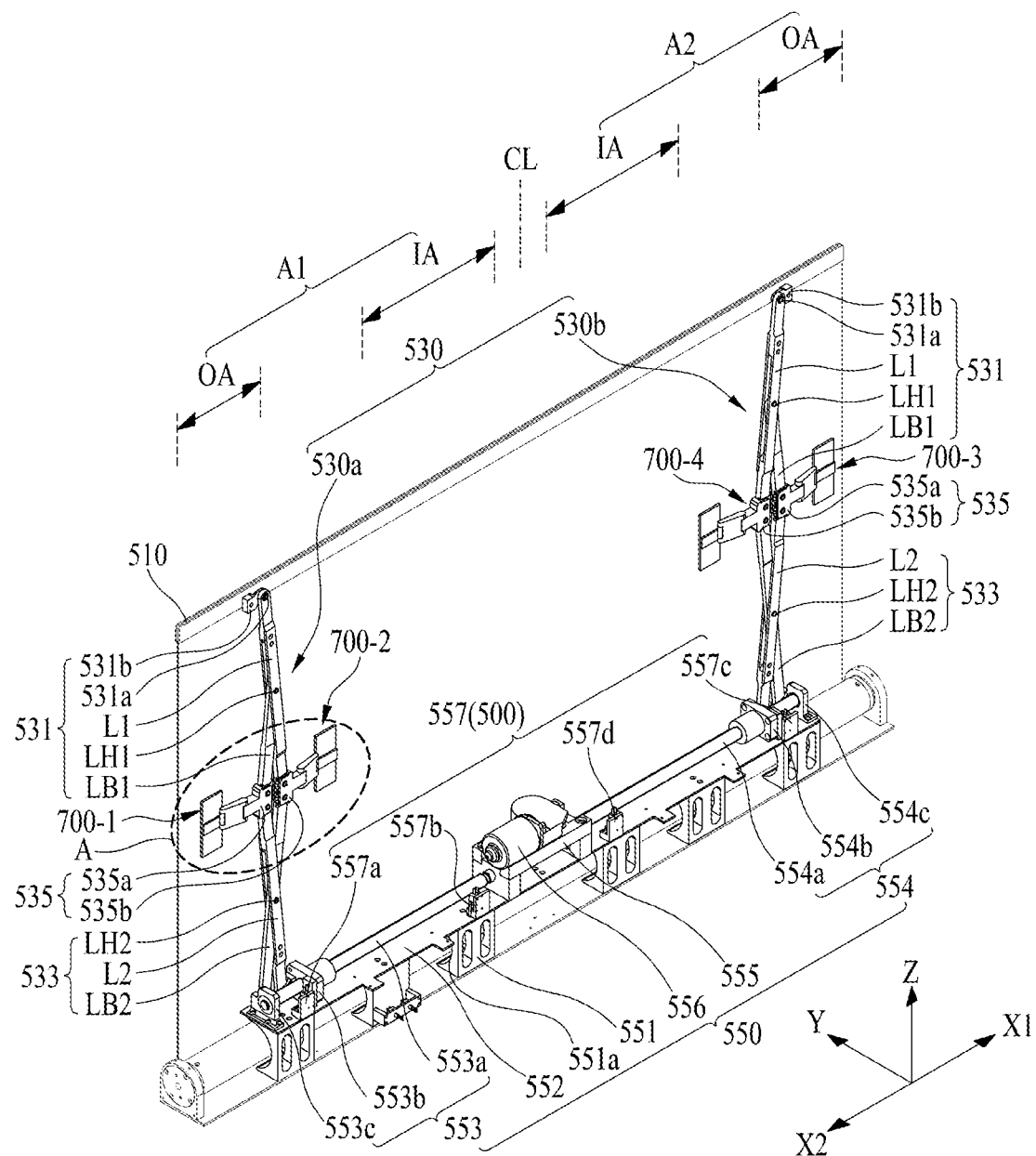
FIG. 5 illustrates an unfolded state of a structure in a rolling module according to an embodiment of the present disclosure.
Figure 6:
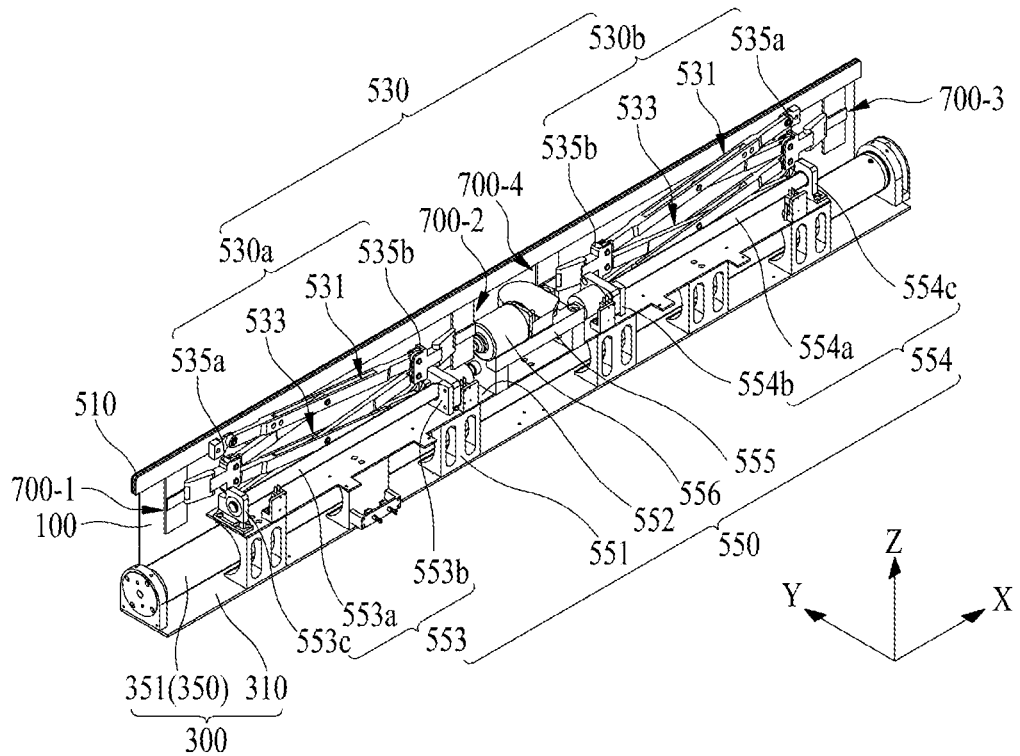
FIG. 6 illustrates a folded state of a structure, in a rolling module according to an embodiment of the present disclosure.
Figure 7:
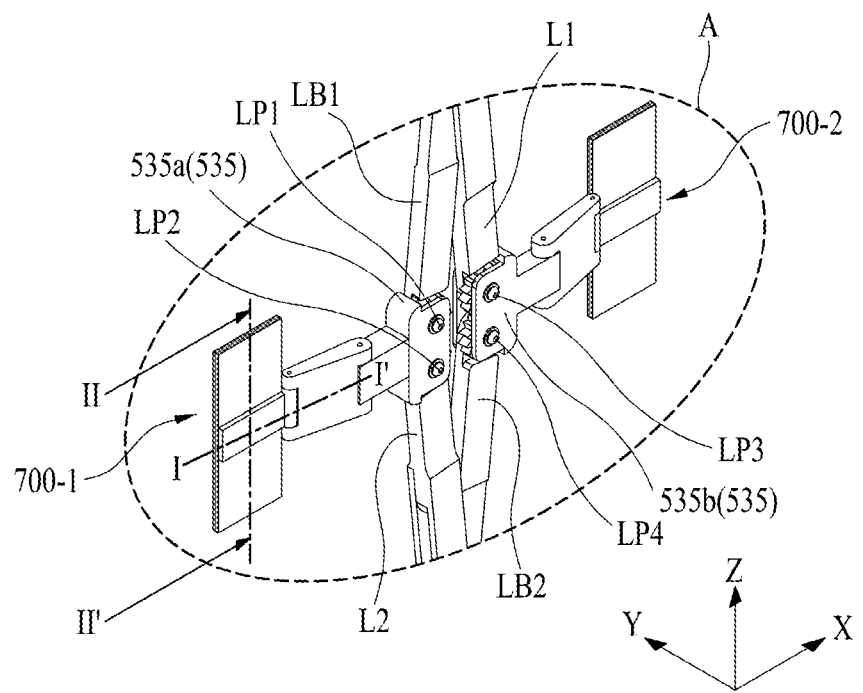
FIG. 7 is an enlarged view of a portion A illustrated in FIG. 5.

FIG. 5 illustrates an unfolded state of a structure in a rolling module according to an embodiment of the present disclosure. FIG. 6 illustrates a folded state of a structure, in a rolling module according to an embodiment of the present disclosure. FIG. 7 is an enlarged view of a portion A illustrated in FIG. 5. FIGS. 5 to 7 illustrate the rolling module according to an embodiment of the present disclosure illustrated in FIG. 3.

With reference to FIGS. 5 to 7 in conjunction with FIG. 3, a rolling module 500 according to an embodiment of the present disclosure may include a supporting frame 510, a structure 530, and a driver 550.

The supporting frame 510 may be disposed on the upper portion of the display panel 100 to cover a periphery portion of an upper portion of the display panel 100, thereby covering the panel driving circuit unit connected to the display panel 100. The supporting frame 510 may have a bar shape which covers the periphery portion of the upper portion of the display panel 100.

The structure 530 may include first and second structures 530*a* and 530*b* that are disposed in parallel and connected between the supporting frame 510 and the driver 550. However, embodiments of the present disclosure are not limited thereto. For example, the structure 530 may include only one of the first and second structures 530*a* and 530*b*, or may additionally include one or more other structures.

The first structure 530*a* may be connected between one side of the supporting frame 510 and the driver 550 and may be folded or unfolded based on driving of the driver 550, and the first structure 530*a* may support the vibration device 700. The first structure 530*a* according to an embodiment may include a first link part 531 including a first portion connected to the supporting frame 510, a second link part 533 including a first portion connected to the driver 550, and a link connection part 535 that rotatably supports a second portion of the first link part 531 and a second portion of the second link part 533 and supports the vibration device 700.

The first link part 531 may be connected to the supporting frame 510 so as to be folded or unfolded. The first link part 531 according to an embodiment may include a first link L1 rotatably disposed on one portion of the supporting frame 510 and a first link bar LB1 rotatably on the first link L1.

The first link L1 may be rotatably disposed on one portion of the supporting frame 510 using a link rotation shaft 531*a*. The first link L1 according to an embodiment may include a first portion connected to the one portion of the supporting frame 510, a second portion connected to the link connection part 535, and a middle portion including a hollow portion between the first portion and the second portion. The first link L1 may have a rectilinear shape or a non-rectilinear shape each having a certain length, based on a distance between the one portion of the supporting frame 510 and the link connection part 535. For example, the first link L1 having a non-rectilinear or a non-linear shape may include a bent portion in the middle portion.

The link rotation shaft 531*a* may pass through the first portion of the first link L1 and may be fixed to the one portion of the supporting frame 510, thereby rotatably supporting the first link L1.

The first link part 531 may further include a link supporting block 531*b* which supports the link rotation shaft 531*a*. The link supporting block 531*b* may be disposed on the one portion of the supporting frame 510 to rotatably support the link rotation shaft 531a. In this case, the link rotation shaft 531a may pass through the first portion of the first link L1 and may be fixed to the link supporting block 531b, thereby rotatably supporting the first link L1.

The first link bar LB1 may be rotatably on the first link L1 using a first link hinge LH1. The first link bar LB1 according to an embodiment may include a first portion inserted into the hollow portion of the first link L1 and rotatably connected to the first link hinge LH1, a second portion connected to the link connection part 535, and a middle portion between the first portion and the second portion. The first portion and the middle portion of the first link bar LB1 may each have a thickness that enables each of the first portion and the middle portion to be inserted into the hollow portion of the first link L1.

The first link hinge LH1 may rotatably support the first portion of the first link bar LB1 that passes through the middle portion of the first link L1 and is inserted into the hollow portion of the first link L1. Also, the first link hinge LH1 may rotatably support the first portion of the first link bar LB1 at a center portion of the first link L1 with respect to a lengthwise direction of the first link L1.

The second link part 533 may be connected to the driver 550 so as to be folded or unfolded. The second link part 533 according to an embodiment may include a second link L2 rotatably on the driver 550 and a second link bar LB2 rotatably connected to the driver 550 and rotatably on the second link L2. For example, the second link L2 and the second link bar LB2 may be rotatably connected to each other in an X-shape, but art not limited thereto.

The second link L2 may be rotatably disposed on the driver 550 and may move in a first direction X according to driving of the driver 550. The second link L2 according to an embodiment may include a first portion rotatably connected to the driver 550, a second portion connected to the link connection part 535, and a middle portion including a hollow portion between the first portion and the second portion. The second link L2 may have a rectilinear or a linear shape or a non-rectilinear or a non-linear shape each having a certain length, based on a distance between the driver 550 and the link connection part 535. For example, the second link L2 having a non-rectilinear or a non-linear shape may include a bent portion in the middle portion.

The second link bar LB2 may intersect the second link L2 and may be rotatably disposed on the second link L2 using a second link hinge LH2. The second link bar LB2 according to an embodiment may include a first portion that passes through the hollow portion of the second link L2 and is rotatably connected to the link connection part 535, a second portion rotatably connected to the driver 550, and a middle portion between the first portion and the second portion. The middle portion of the second link bar LB2 may be inserted into the hollow portion of the second link L2 and may have a thickness which enables the middle portion to be inserted into the hollow portion of the second link L2.

The second link hinge LH2 may rotatably support the middle portion of the second link bar LB2 that passes through the middle portion of the second link L2 and is inserted into the hollow portion of the second link L2. Also, the second link hinge LH2 may rotatably support a center of the middle portion of the second link bar LB2 at a center portion of the second link L2 with respect to a lengthwise direction of the second link bar LB2.

The link connection part 535 may include a first joint member 535a, which rotatably supports the first link bar LB1 of the first link part 531 and the second link L2 of the second link part 533, and a second joint member 535b, which rotatably supports the first link L1 of the first link part 531 and the second link bar LB2 of the second link part 533.

The first joint member 535a may rotatably support the first link bar LB1 of the first link part 531 using a first link pin LP1 and may support the vibration device 700. The first link pin LP1 may pass through one portion of the first joint member 535a and may rotatably support a second portion of the first link bar LB1 of the first link part 531.

The first joint member 535a may rotatably support the second link L2 of the second link part 533 using a second link pin LP2 and may support the vibration device 700. The second link pin LP2 may pass through the other portion of the first joint member 535a and may rotatably support a second portion of the second link L2 of the second link part 533.

The second portion of the first link bar LB1 and the second portion of the second link L2 which are rotatably connected to the first joint member 535a may be rotatably connected to each other. For example, the second portion of the first link bar LB1 and the second portion of the second link L2 may each have a gear structure, and thus, the second portion of the first link bar LB1 and the second portion of the second link L2 may rotate in engagement with each other. In this case, the rotation of the second link L2 may be more stably transferred to the first link bar LB1.

The second joint member 535b may rotatably support the first link L1 of the first link part 531 using a third link pin LP3 and may support the vibration device 700. The third link pin LP3 may pass through one portion of the second joint member 535b and may rotatably support a second portion of the first link L1 of the first link part 531.

The second joint member 535b may rotatably support the second link bar LB2 of the second link part 533 using a fourth link pin LP4 and may support the vibration device 700. The fourth link pin LP4 may pass through the other portion of the second joint member 535b and may rotatably support a second portion of the second link bar LB2 of the second link part 533.

The second portion of the first link L1 and the second portion of the second link bar LB2 which are rotatably connected to the second joint member 535b may be rotatably connected to each other. For example, the second portion of the first link L1 and the second portion of the second link bar LB2 may each have a gear structure, and thus, the second portion of the first link L1 and the second portion of the second link bar LB2 may rotate in engagement with each other. In this case, the rotation of the second link bar LB2 may be more stably transferred to the first link L1.

The second structure 530b may be connected between the other portion of the supporting frame 510 and the driver 550 in parallel with the first structure 530a and may be folded or unfolded based on driving of the driver 550, and the second structure 530b may support the vibration device 700. The second structure 530b according to an embodiment may include a first link part 531 including a first portion connected to the supporting frame 510, a second link part 533 including a first portion connected to the driver 550, and a link connection part 535 which rotatably supports a second portion of the first link part 531 and a second portion of the second link part 533 and supports the vibration device 700. Except for that the first link part 531, the second link part 533, and the link connection part 535 of the second structure 530b are connected between the other portion of the supporting frame 510 and the driver 550, the first link part 531, the second link part 533, and the link connection part 535 of the second structure 530b are the same as the first link part 531, the second link part 533, and the link connection part 535 of the first structure 530a, and thus, like reference numeral refer to like elements and their repetitive descriptions are omitted.

The driver 550 may simultaneously fold or unfold the first structure 530a and the second structure 530b in response to a manipulation of a user (a viewer), thereby winding or unwinding the display panel 100 connected to the first structure 530a and the second structure 530b. The driver 550 according to an embodiment may include a plurality of fixing members 551, a supporting plate 552, a first driving unit 553, a second driving unit 554, a power transfer unit 555, and a driving motor 556.

The plurality of fixing members 551 may be arranged at certain intervals in the housing plate 310 of the housing module 300. Each of the plurality of fixing members 551 may surround a portion of the rolling roller 351 of the housing module 300. For example, an inner portion of each of the plurality of fixing members 551 may have a curve or a rounded portion 551a surrounding a portion of the rolling roller 351 and may be spaced apart from an outer circumference of the rolling roller 351 by a certain distance. The inner portion of each of the plurality of fixing members 551 and the outer circumference of the rolling roller 351 may be spaced apart from each other by a distance which is equal to or greater than a winding thickness of the display panel 100 wound around the rolling roller 351.

The supporting plate 552 may be disposed on the plurality of fixing members 551 and may be disposed on the rolling roller 351. The supporting plate 552 may support the first driving unit 553, the second driving unit 554, and the power transfer unit 555.

The first driving unit 553 may fold or unfold the first structure 530a, based on power transferred from the power transfer unit 555. The first driving unit 553 according to an embodiment may include a first ball screw 553a, a first ball catch 553b, and a first link bracket 553c.

The first ball screw 553a may be disposed on the supporting plate 552 and may be rotatably supported by the power transfer unit 555 and the first link bracket 553c. For example, one end of the first ball screw 553a may be rotatably connected to the power transfer unit 555, and the other end of the first ball screw 553a may be rotatably supported by the first link bracket 553c.

The first ball catch 553b may be movably fastened to the first ball screw 553a and may rotatably support the second portion of the second link L2 of the second link part 533 included in the first structure 530a. The first ball catch 553b may perform a rectilinear motion in a first direction X on the first ball screw 553a on the basis of a rotational motion of the first ball screw 553a to allow the second link L2 of the second link part 533 to perform a rectilinear motion in the first direction X.

The first link bracket 553c may be disposed on one periphery of the supporting plate 552, may rotatably support the other end of the first ball screw 553a, and may rotatably support the second portion of the second link bar LB2 of the second link part 533 in the first structure 530a.

The first driving unit 553 may move the second portion of the second link L2 of the second link part 533 in the first structure 530a in a first rectilinear direction X1, based on a rectilinear motion of the first ball catch 553b performed in the first rectilinear direction X1 on the basis of a first-direction rotation of the first ball screw 553a, thereby folding the first structure 530a. At this time, as the second side of the second link L2 of the second link part 533 moves in the first rectilinear direction X1, the second link part 533 of the first structure 530a may be folded with reference to the second link hinge LH2, and the first link part 531 of the first structure 530a may be folded with reference to the first link hinge LH1 according to the folding of the second link part 533 transferred through the link connection part 535.

On the other hand, the first driving unit 553 may move the second portion of the second link L2 of the second link part 533 in the first structure 530a in a second rectilinear direction X2, based on a rectilinear motion of the first ball catch 553b performed in the second rectilinear direction X2 opposite to the first rectilinear direction X1 on the basis of a second-direction rotation, which is opposite to the first-direction rotation, of the first ball screw 553a, thereby unfolding the first structure 530a. At this time, as the second side of the second link L2 of the second link part 533 moves in the second rectilinear direction X2, the second link part 533 of the first structure 530a may be unfolded with reference to the second link hinge LH2, and the first link part 531 of the first structure 530a may be unfolded with reference to the first link hinge LH1 according to the unfolding of the second link part 533 transferred through the link connection part 535.

The second driving unit 554 may fold or unfold the second structure 530b, based on power transferred from the power transfer unit 555. The second driving unit 554 according to an embodiment may include a second ball screw 554a, a second ball catch 554b, and a second link bracket 554c.

The second ball screw 554b may be disposed on the supporting plate 552 and may be rotatably supported by the power transfer unit 555 and the second link bracket 554c. For example, one end of the second ball screw 554a may be rotatably connected to the power transfer unit 555, and the other end of the second ball screw 554a may be rotatably supported by the second link bracket 554c.

The second ball catch 554b may be movably fastened to the second ball screw 554a and may rotatably support the second side of the second link L2 of the second link part 533 included in the second structure 530b. The second ball catch 554b may perform a rectilinear motion in the first direction X on the second ball screw 554a on the basis of a rotational motion of the second ball screw 554a to allow the second link L2 of the second link part 533 to perform a rectilinear motion in the first direction X. The second link bracket 554c may be disposed on the other periphery of the supporting plate 552, may rotatably support the other end of the second ball screw 554a, and may rotatably support the second portion of the second link bar LB2 of the second link part 533 in the second structure 530b.

The second driving unit 554 may move the second portion of the second link L2 of the second link part 533 in the second structure 530b in the second rectilinear direction X2, based on a rectilinear motion of the second ball catch 554b performed in the second rectilinear direction X2 on the basis of a second-direction rotation of the second ball screw 554a, thereby folding the second structure 530b as illustrated in FIG. 6. At this time, as the second portion of the second link L2 of the second link part 533 moves in the second rectilinear direction X2, the second link part 533 of the second structure 530b may be folded with reference to the second link hinge LH2, and the first link part 531 of the second structure 530b may be folded with reference to the first link hinge LH1 according to the folding of the second link part 533 transferred through the link connection part 535.

On the other hand, the second driving unit 554 may move the second portion of the second link L2 of the second link part 533 in the second structure 530b in the first rectilinear direction X1, based on a rectilinear motion of the second ball catch 554b performed in the first rectilinear direction X1 on the basis of a first-direction rotation of the second ball screw 554a, thereby unfolding the second structure 530b, as illustrated in FIG. 5. At this time, as the second portion of the second link L2 of the second link part 533 moves in the first rectilinear direction X1, the second link part 533 of the second structure 530b may be unfolded with reference to the second link hinge LH2, and the first link part 531 of the second structure 530b may be unfolded with reference to the first link hinge LH1 according to the unfolding of the second link part 533 transferred through the link connection part 535.

The power transfer unit 555 may be disposed on the middle portion of the supporting plate 552, may rotatably support one end of the first ball screw 553a and one end of the second ball screw 554a, and may transfer a rotational power of the driving motor 556 to the one end of the first ball screw 553a and the one end of the second ball screw 554a. The power transfer unit 555 according to an embodiment may include a rotation gear, a first pinion gear, and a second pinion gear. The power transfer unit 555 including the rotation gear and the first and second pinion gears may be referred to as a bevel gear box including a gear and a pinion.

The rotation gear may be a gear of a bevel gear which rotates based on a rotation of the driving motor 556. The first pinion gear may be fixed to the one end of the first ball screw 553a and may be disposed to engage with the rotation gear, and the first pinion gear may rotate based on a rotation of the rotation gear to rotate the first ball screw 553a. The second pinion gear may be fixed to the one end of the second ball screw 554a and may be disposed to engage with the rotation gear, and the second pinion gear may rotate in a direction opposite to a rotation direction of the first pinion gear on the basis of a rotation of the rotation gear to rotate the second ball screw 554a.

Each of the rotation gear, the first pinion gear, and the second pinion gear according to an embodiment may have a straight bevel gear structure, a spiral bevel gear structure, or a Zerol bevel gear structure, and for example, may have the spiral bevel gear structure for decreasing a vibration or noise.

The driving motor 556 may be disposed on the power transfer unit 555 and may rotate the rotation gear of the power transfer unit 555 in response to a manipulation of a user (or a viewer).

The driver 550 according to an embodiment of the present disclosure may further include a first limit switch 557a disposed adjacent to the first link bracket 553c, a second limit switch 557b disposed adjacent to one portion of the power transfer unit 555, a third limit switch 557c disposed adjacent to the second link bracket 554c, and a fourth limit switch 557d disposed adjacent to the other portion of the power transfer unit 555.

The first limit switch 557a may output a first limit signal when contacting the first ball catch 553b that performs a rectilinear motion in the second rectilinear direction X2, and the second limit switch 557b may output a second limit signal when contacting the first ball catch 553b that performs a rectilinear motion in the first rectilinear direction X1. The third limit switch 557c may output a third limit signal when contacting the second ball catch 554b that performs a rectilinear motion in the first rectilinear direction X1, and the fourth limit switch 557d may output a fourth limit signal when contacting the second ball catch 554b which performs a rectilinear motion in the second rectilinear direction X2. The driver 550 according to an embodiment of the present disclosure may further include a driving control circuit that controls driving of the driving motor 556 in response to a manipulation of a user (or a viewer) and stops the driving of the driving motor 556 in response to each of the first to fourth limit signals.

Figure 8:
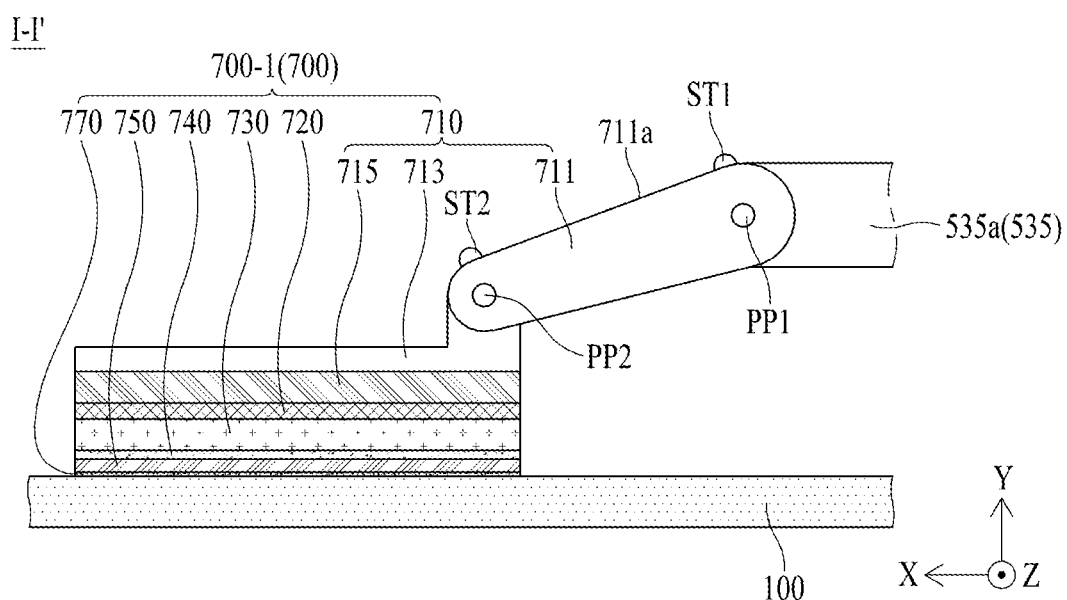
FIG. 8 is a cross-sectional view taken along line I-I' illustrated in FIG. 7.
Figure 9:
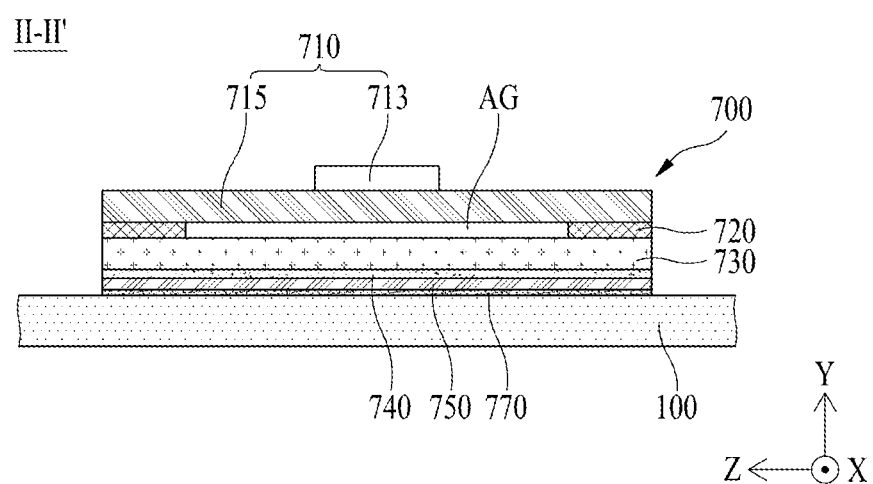
FIG. 9 is a cross-sectional view taken along line II-II' illustrated in FIG. 7.

FIG. 8 is a cross-sectional view taken along line I-I' illustrated in FIG. 7. FIG. 9 is a cross-sectional view taken along line II-II' illustrated in FIG. 7. FIGS. 8 and 9 illustrate a vibration device 700 according to an embodiment of the present disclosure.

With reference to FIGS. 8 and 9 in conjunction with FIGS. 5 to 7, the vibration device 700 according to an embodiment of the present disclosure may be disposed on the first and second structures 530a and 530b of the rolling module 500 and may vibrate the display panel 100 which is unfolded.

The vibration device 700 according to an embodiment may include first to fourth vibration modules 700-1 to 700-4, but the present disclosure is not limited thereto. The first vibration module 700-1 and the second vibration module 700-2 may be disposed in parallel with the first structure 530a of the rolling module 500 therebetween to directly vibrate a first rear region A1 of the display panel 100. Here, as seen from the rear surface of the display panel 100, the first rear region A1 of the display panel 100 may be a left region of the display panel 100 with respect to a long-side (or widthwise) center CL of the display panel 100.

The first vibration module 700-1 and the second vibration module 700-2 may be disposed to the first structure 530a of the rolling module 500 to directly vibrate the first rear region A1 of the display panel 100. The first vibration module 700-1 may directly vibrate an outer region OA of the first rear region A1 of the display panel 100, and the second vibration module 700-2 may directly vibrate an inner region IA of the first rear region A1 of the display panel 100. Here, with respect to the display panel 100 where the whole display area is unfolded, the outer region OA of the first rear region A1 may be a region between one side surface (or one short side) of the display panel 100 and the first structure 530a, and the inner region IA of the first rear region A1 may be a region between the long-side center CL of the display panel 100 and the first structure 530a.

One of the first vibration module 700-1 and the second vibration module 700-2 may be omitted. For example, considering a panel vibration characteristic based on an unfolded size of the display panel 100, the first vibration module 700-1 which moves a rectilinear direction LD in the outer region OA of the first rear region A1 of the display panel 100 according to folding or unfolding of the first structure 530a may be omitted instead of the second vibration module 700-2 which moves in a diagonal direction DD in the inner region IA of the first rear region A1 of the display panel 100 according to folding or unfolding of the first structure 530a.

The third vibration module 700-3 and the fourth vibration module 700-4 may be disposed in parallel with the second structure 530b of the rolling module 500 therebetween to directly vibrate a second rear region A2 of the display panel 100. Here, as seen from the rear surface of the display panel 100, the second rear region A2 of the display panel 100 may be a right region of the display panel 100 with respect to the long-side (or widthwise) center CL of the display panel 100.

The third vibration module 700-3 and the fourth vibration module 700-4 may be disposed to the second structure 530b of the rolling module 500 to directly vibrate the second rear region A2 of the display panel 100. The third vibration module 700-3 may directly vibrate an outer region OA of the second rear region A2 of the display panel 100, and the fourth vibration module 700-4 may directly vibrate an inner region IA of the second rear region A2 of the display panel 100. Here, with respect to the display panel 100 where the whole display area is unfolded, the outer region OA of the second rear region A2 may be a region between the other side surface (or the other short side) and the second structure 530b, and the inner region IA of the second rear region A2 may be a region between the long-side center CL of the display panel 100 and the second structure 530b.

One of the third vibration module 700-3 and the fourth vibration module 700-4 may be omitted. For example, considering a panel vibration characteristic based on an unfolded size of the display panel 100, the third vibration module 700-3, which moves the rectilinear direction LD in the outer region OA of the second rear region A2 of the display panel 100 according to folding or unfolding of the second structure 530b, may be omitted instead of the fourth vibration module 700-4 which moves in the diagonal direction DD in the inner region IA of the second rear region A2 of the display panel 100 according to folding or unfolding of the second structure 530b.

The first vibration module 700-1 according to an embodiment may include a module supporting member 710, a vibration generating device 730, and a magnetic member 750. The module supporting member 710 may be rotatably disposed on the first structure 530a of the rolling module 500 to rotatably support the vibration generating device 730, thereby allowing the vibration generating device 730 to contact the rear surface of the display panel which is unfolded. Also, when the module supporting member 710 is fixedly disposed on the first structure 530a so as not to rotate, the display panel 100 may be wound or unwound in a state of physically contacting the vibration device 700, and due to this, the display panel 100 and/or the vibration device 700 may be damaged and a region, contacting the vibration device 700, of the display panel 100 may protrude, whereby the display panel 100 may not flatly be maintained. Therefore, when the module supporting member 710 is rotatably disposed on the first structure 530a, the vibration device 700 may rotate (or move) based on a flatness of the display panel 100, which is wound or unwound, and thus, the display panel 100 may be flatly maintained. Also, the module supporting member 710 may have a two-link structure which is rotatable based on the flatness of the display panel 100 and may be rotatably disposed on the first structure 530a. In addition to the two-link structure, the module supporting member 710 may have a structure which enables the first structure 530a to rotate. The module supporting member 710 according to an embodiment may include a first rotation link 711, a second rotation link 713, and a supporting bracket 715.

The first rotation link 711 may be disposed on the first joint member 535a of the first structure 530a so as to rotate in a second direction Y using a first pivot pin PP1. Here, the second direction Y may be a direction intersecting the first direction X or a thickness direction of the display panel 100.

The first rotation link 711 according to an embodiment may include a pair of first sidewalls which protrude in parallel from both peripheries of a first portion of the first rotation link 711. The first pivot pin PP1 may be inserted or accommodated into one of the pair of first sidewalls in the first rotation link 711 and may be inserted or accommodated into the other sidewall of the pair of first sidewalls through the first joint member 535a of the first structure 530a, thereby rotatably supporting the first rotation link 711. Accordingly, the first rotation link 711 may be rotatably connected to the first joint member 535a of the first structure 530a by the first pivot pin PP1.

The first joint member 535a of the first structure 530a may include a protrusion which protrudes toward one portion of the display panel 100, and the protrusion may be inserted between the pair of first sidewalls in the first rotation link 711.

A maximum rotation angle of the first rotation link 711 may be limited by a first stopper ST1 provided in the first joint member 535a of the first structure 530a. The first stopper ST1 may protrude by a certain height from an upper end of the protrusion of the first joint member 535a adjacent to the first portion of the first rotation link 711. The first stopper ST1 may contact the first portion of the first rotation link 711 that rotates in a direction deviating from the rear surface of the display panel 100, and thus, may limit a maximum rotation angle of the first rotation link 711, whereby a vibration of the vibration generating device 730 may be transferred to the display panel 100 without being damaged by a rotation of the first rotation link 711.

The second rotation link 713 may be disposed on a second portion of the first rotation link 711 to rotate in the second direction Y using a second pivot pin PP2.

The first rotation link 711 according to an embodiment may include a pair of second sidewalls which protrude in parallel from both peripheries of a second portion of the first rotation link 711. The second pivot pin PP2 may be inserted into one of the pair of second sidewalls in the first rotation link 711 and may be inserted into the other sidewall of the pair of second sidewalls through one portion of the second rotation link 713, thereby rotatably supporting the second rotation link 713. Accordingly, the second rotation link 713 may be rotatably connected to the second portion of the first rotation link 711 by the second pivot pin PP2.

The second rotation link 713 may further include a second stopper ST2. The second stopper ST2 may protrude by a certain height from one upper surface 711a of the second rotation link 713 adjacent to the first rotation link 711. When the second rotation link 713 is rotating, the second stopper ST2 may contact the first rotation link 711 to limit a maximum rotation angle of the second rotation link 713, and thus, a vibration of the vibration generating device 730 may be transferred to the display panel 100 without being damaged by a rotation of the second rotation link 713.

The first rotation link 711 and the second rotation link 713 may each have a two-link structure which has fluidity in a direction toward the rear surface of the display panel 100, and thus, may maintain the flatness of the display panel 100, thereby enhancing adhesiveness between the vibration generating device 730 and the display panel 100.

The supporting bracket 715 may be coupled or connected to a rear surface of the second rotation link 714 facing the rear surface of the display panel 100 and may support the vibration generating device 730. The supporting bracket 715 may have a size which is relatively wide with respect to the second rotation link 713, and for example, may have the same size as that of the vibration generating device 730, but is not limited thereto.

The vibration generating device 730 may be coupled or connected to a rear surface of the supporting bracket 715 of the module supporting member 710 facing the rear surface of the display panel 100 using an adhesive member 720. The vibration generating device 730 may contact the rear surface of the display panel 100 and may vibrate the display panel 100, based on a sound signal (or a voice signal) provided from a sound driving circuit.

The vibration generating device 730 according to an embodiment may include a piezoelectric material layer having a piezoelectric effect, a first electrode on a front surface of the piezoelectric material layer, and a second electrode on a rear surface of the piezoelectric material layer. The vibration generating device 730 may include the piezoelectric material layer, and thus, may be referred to as a piezoelectric device.

The piezoelectric material layer may include a piezoelectric material which vibrates with an electric field. Here, the piezoelectric material may have a characteristic in which as pressure is applied to or twisting occurs in a crystalline structure due to an external force, a potential difference is caused by dielectric polarization based on a relative position change of a positive (+) ion and a negative (−) ion, and vibration occurs due to an electric field based on an applied voltage. For example, the piezoelectric material layer may have a square or rectangular hexahedron structure.

The piezoelectric material layer according to an embodiment may include a polymer material-containing piezoelectric material, a thin film material-containing piezoelectric material, a composite material-containing piezoelectric material, or a single crystalline ceramic or polycrystalline ceramic-containing piezoelectric material. Examples of the polymer material-containing piezoelectric material may include polyvinylidene fluoride (PVDF), poly(vinylidene fluoride-trifluoroethylene) P(VDF-TrFe), and poly(vinylidene fluoride-tetrafluoroethylene) P(VDFTeFE). Examples of the thin film material-containing piezoelectric material may include ZnO, CdS, and AlN. Examples of the composite material-containing piezoelectric material may include lead zirconate titanate-polyvinylidene fluoride (PZT-PVDF), PZT-silicon rubber, PZT-epoxy, PZT-foam polymer, and PZT-foam urethane. Examples of the single crystalline ceramic-containing piezoelectric material may include $\alpha$-AlPO$_4$, $\alpha$-SiO$_2$, LiNbO$_3$, Tb$_2$(MoO$_4$)$_3$, Li$_2$B$_4$O$_7$, and ZnO. Examples of the polycrystalline ceramic-containing piezoelectric material may include a PZT-based material, a PT-based material, a PZT-complex Perovskite-based material, and BaTiO$_3$.

The first electrode and the second electrode according to an embodiment may be provided to overlap each other with the piezoelectric material layer therebetween. The first electrode and the second electrode may each include an opaque metal material which is relatively low in resistance and is good in heat dissipation characteristic, but are not limited thereto. In other embodiments, the first electrode and the second electrode may each include a transparent conductive material or a conductive polymer material.

Therefore, the vibration generating device 730 may contact the rear surface of the display panel 100 and may repeatedly expand and contract based on an inverse piezoelectric effect of a piezoelectric material according to the sound signal (or the voice signal) provided from the sound driving circuit, thereby vibrating the display panel 100.

The vibration generating device 730 according to an embodiment of the present disclosure may be coupled or connected to the rear surface of the supporting bracket 715 by the adhesive member 720.

The whole rear surface of the vibration generating device 730 according to an embodiment may be coupled or connected to the rear surface of the supporting bracket 715 by the adhesive member 720.

According to another embodiment, a portion of the rear surface of the vibration generating device 730 may be coupled or connected to the rear surface of the supporting bracket 715 by the adhesive member 720. For example, the vibration generating device 730 may be coupled or connected to the rear surface of the supporting bracket 715 with an air gap AG therebetween. For example, the adhesive member 720 may be disposed between the supporting bracket 715 and one periphery of the vibration generating device 730, and between the supporting bracket 715 and the other periphery of the vibration generating device 730 with respect to a lengthwise direction of the vibration generating device 730, and thus, the air gap AG may be provided between the vibration generating device 730 and a portion, other than one periphery and the other periphery, of the supporting bracket 715.

The air gap AG may allow each of the vibration generating device 730 and the display panel 100 to independently vibrate. Also, the air gap AG may be provided between the vibration generating device 730 and the module supporting member 710. Therefore, the air gap AG may enable the vibration generating device 730 to smoothly vibrate and may enable the display panel 100 to be freely deformed based on the smooth vibration of the vibration generating device 730, and thus, may increase a vibration amplitude of the display panel 100, thereby increasing a sound pressure characteristic of a sound generated based on a vibration of the display panel 100.

The adhesive member 720 may include a double-sided tape or a naturally curable adhesive. For example, the adhesive member 720 may include a thermocurable adhesive or a photocurable adhesive, but in this case, a characteristic of the vibration generating device 730 may be reduced by heat of a curing process of curing the adhesive member 720. Therefore, the adhesive member 720 may include a double-sided tape or a naturally curable adhesive.

The magnetic member (or magnetic force member) 750 may be attached on a front surface of the vibration generating device 730 by the adhesive layer 740. The magnetic member 750 according to an embodiment may include one magnet plate (or a magnet force plate) which has the same size as that of the front surface of the vibration generating device 730 and is attached on the front surface of the vibration generating device 730. The magnetic member 750 may be attached on (or adhered to) an encapsulation substrate of the display panel 100 which is unfolded, and thus, may transfer a vibration of the vibration generating device 730 to an unfolded rear surface of the display panel 100. The magnetic member 750 may act as a vibration transfer medium that transfers the vibration of the vibration generating device 730 to the display panel 100. Accordingly, the magnetic member 750 may be attached on the front surface of the vibration generating device 730, and thus, may move or slide based on folding or unfolding of the display panel 100, whereby the magnetic member 750 may be applied to a rollable display panel.

The magnetic member 750 may rotate by the second rotation link 713 and the first rotation link 711 and may be disposed adjacent to the rear surface of the display panel 100. Therefore, when the display panel 100 is unfolded by the unwinding, the magnetic member 750 may be attracted to the encapsulation substrate of the display panel 100 by a magnetic force and may be attached on the encapsulation substrate of the display panel 100. Therefore, the vibration generating device 730 may contact the encapsulation substrate of the display panel 100 using the magnetic member 750 and may vibrate based on a sound signal to vibrate the display panel 100. For example, the display panel 100 may vibrate based on a vibration transferred through the magnetic member 750 from the vibration generating device 730 to generate a panel vibration sound, and the panel vibration sound may be output to a forward region in front of the display panel 100. At this time, the second rotation link 713 and the first rotation link 711 may be rotated by being interlocked with the attraction force that the magnetic member 750 is attracted to the encapsulation substrate of the display panel 100 by the magnetic force, and thus, may allow the magnetic member 750 to be attached on the encapsulation substrate of the display panel 100.

The magnetic member 750 according to an embodiment may include a neodymium magnet having a relatively strong magnetic force (or ferromagnetism). For example, the neodymium magnet may include neodymium-iron-boron (Nd—Fe—B), but is not limited thereto.

According to another embodiment, the magnetic member 750 may use $Fe_2O_3$, $BaCO_3$, a neodymium magnet, strontium ferrite with improved magnet component, an alloy cast magnet including Al, nickel (Ni), and cobalt (Co), and/or the like, but is not limited thereto and may use a permanent magnet having a magnetic force.

The first vibration module 700-1 according to an embodiment may further include a coating layer 770 in the magnetic member 750.

The coating layer 770 may be disposed on a front surface (or a panel contact surface) of the magnetic member 750 directly contacting the rear surface of the display panel 10 to decrease a frictional force between the magnetic member 750 and the rear surface of the display panel 100 that is unfolded. Here, when the display panel 100 is unwound by a certain length, the magnetic member 750 may be attached on the rear surface of the display panel 100 which is unfolded, and the display panel 100 may be more unfolded with the magnetic member 750 being attached thereon. Also, when the frictional force between the magnetic member 750 and the rear surface of the display panel 100 is high, a scratch may occur in the rear surface of the display panel 100 or noise may occur. To solve such a problem, the coating layer 770 may include a material having a relatively low friction coefficient and may be provided on a front surface of the magnetic member 750, thereby decreasing the frictional force between the magnetic member 750 and the rear surface of the display panel 100 which is unfolded.

The coating layer 770 according to an embodiment may include a material having a friction coefficient of about 0.05 to about 0.5. The material may be a magnetic lubricating material, but is not limited thereto. The magnetic lubricating material according to an embodiment may be one of polytetrafluoroethylene (PTFE) having a friction coefficient of about 0.05 to about 0.1, polyimide (PI) having a friction coefficient of about 0.2 to about 0.5, polybenzimidazole (PBI) having a friction coefficient of about 0.24, polyamide imide (PAI) having a friction coefficient of about 0.25 to about 0.45, polyetherether ketone (PEEK) having a friction coefficient of about 0.3 to about 0.5, and polyetherimide (PEI) having a friction coefficient of about 0.42. For example, the coating layer 770 may include PTFE having a relatively low friction coefficient.

Except for that the second vibration module 700-2 is rotatably disposed on the second joint member 535b of the first structure 530a, the second vibration module 700-2 according to an embodiment may include a module supporting member, a vibration generating device, and a magnetic member like the first vibration module 700-1. The elements of the second vibration module 700-2 may be the module supporting member 710, the vibration generating device 730, and the magnetic member 750 of the first vibration module 700-1, and thus, like reference numerals refer to like elements and their repetitive descriptions are omitted.

Except for that the third vibration module 700-3 is rotatably disposed on the first joint member 535a of the second structure 530b, the third vibration module 700-3 according to an embodiment may include a module supporting member, a vibration generating device, and a magnetic member like the first vibration module 700-1. The elements of the third vibration module 700-3 may be the module supporting member 710, the vibration generating device 730, and the magnetic member 750 of the first vibration module 700-1, and thus, like reference numerals refer to like elements and their repetitive descriptions are omitted.

Except for that the fourth vibration module 700-4 is rotatably disposed on the second joint member 535b of the second structure 530b, the fourth vibration module 700-4 according to an embodiment may include a module supporting member, a vibration generating device, and a magnetic member like the first vibration module 700-1. The elements of the fourth vibration module 700-4 may be the module supporting member 710, the vibration generating device 730, and the magnetic member 750 of the first vibration module 700-1, and thus, like reference numerals refer to like elements and their repetitive descriptions are omitted.

Each of the first to fourth vibration modules 700-1 to 700-4 may not be connected to the link connection part 535 of the structure 530 and may be connected to the links L1 and L2 or the link bars LB1 and LB2 of the link parts 531 and 533. For example, each of the first to fourth vibration modules 700-1 to 700-4 may be damaged by the links L1 and L2 or the link bars LB1 and LB2 that are folded in an intersection form when the link parts 531 and 533 are folded, or may be damaged by folding between the first link part 531 and the second link part 533, and thus, each of the first to fourth vibration modules 700-1 to 700-4 may be connected to the link connection part 535 of the structure 530.

Figure 10:
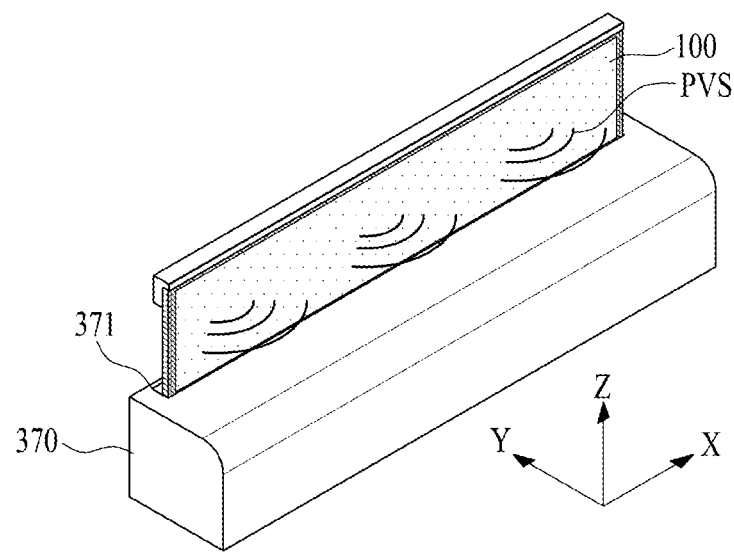
FIG. 10 illustrates a sound output in a local display mode of a display apparatus according to an embodiment of the present disclosure.
Figure 11:
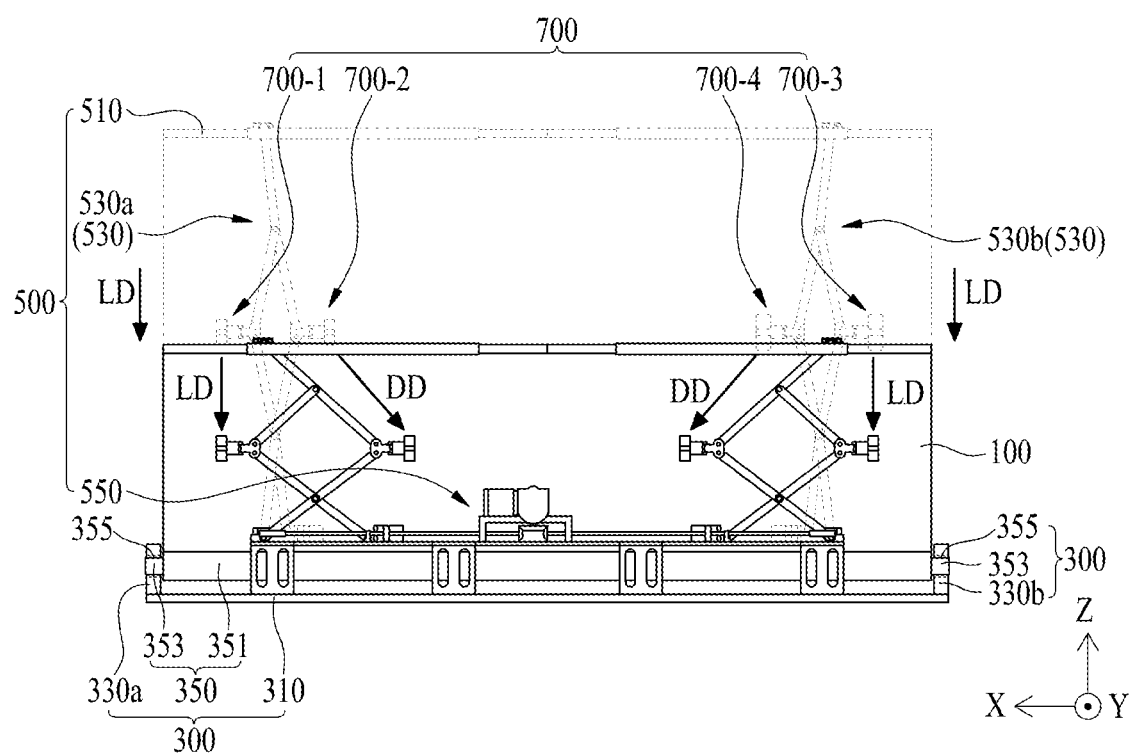
FIG. 11 illustrates a rolling module and a vibration device in the local display mode of the display apparatus illustrated in FIG. 10.

FIG. 10 illustrates a sound output in a local display mode of a display apparatus according to an embodiment of the present disclosure. FIG. 11 illustrates a rolling module and a vibration device in the local display mode of the display apparatus illustrated in FIG. 10.

With reference to FIGS. 10 and 11, the display apparatus according to an embodiment of the present disclosure may operate in the local screen mode (or a partial display mode), based on a selection of a user (or a viewer). For example, the display apparatus according to an embodiment of the present disclosure may unfold the display area of the display panel 100 in proportion to a degree of directly control (or adjustment) by the user (or the viewer), or may unfold only the display area of the display panel 100 set based on the local screen mode selected by the user (or the viewer). Also, the vibration device 700 may move along with folding or unfolding of the structures 530a and 530b of the rolling module 500 to vibrate the display panel 100 unfolded by the local screen mode. For example, each of the first and third vibration modules 700-1 and 700-3 of the vibration device 700 may move in the rectilinear direction LD when the structures 530a and 530b are folded or unfolded, and each of the second and fourth vibration modules 700-2 and 700-4 of the vibration device 700 may move to a center of the display panel 100 in the diagonal direction DD when the structures 530a and 530b are folded or unfolded.

Because the vibration device 700 moves along with folding or unfolding of the structures 530a and 530b of the rolling module 500, the display apparatus according to an embodiment of the present disclosure may output a panel vibration sound, generated by a vibration of the display panel 100, to a forward region in front of the display panel 100 in a full screen mode illustrated in FIG. 1 or the local screen mode illustrated in FIG. 10.

The inventors have recognized that, when a magnet member is provided as one, a vibration of a vibration generating device is not transferred to a display panel. Therefore, through various experiments, the inventors have invented a vibration module having a new structure in which a vibration generated by the vibration generating device is transferred to the display panel without being lost. This will be described below.

Figure 12:
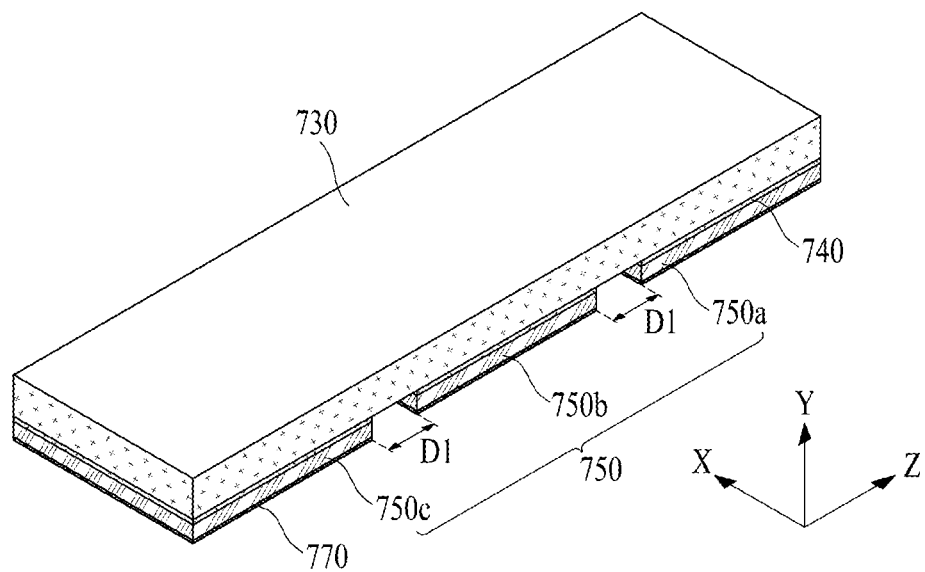
FIG. 12 illustrates a magnetic member according to another embodiment in a display apparatus according to an embodiment of the present disclosure.

FIG. 12 illustrates a magnetic member according to another embodiment in a display apparatus according to an embodiment of the present disclosure.

With reference to FIG. 12, the magnetic member 750 according to another embodiment may include a plurality of magnet plates 750a to 750c. The plurality of magnet plates 750a to 750c may be arranged at a first interval D1 and may each be attached on a front surface of a vibration generating device 730. The plurality of magnet plates 750a to 750c may be arranged in parallel at the first interval D1 on the front surface of the vibration generating device 730, and thus, may increase an adhesiveness of the vibration generating device 730 to the display panel 100 and may enable the vibration generating device 730 to more smoothly contract and expand, thereby increasing a vibration efficiency of the vibration generating device 730. Also, a harmonic vibration of the vibration generating device 730 may not be limited, and thus, a vibration characteristic similar to a vibration form (or motion) of the vibration generating device 730 may be transferred to the display panel 100. Also, when the magnetic member 750 is configured as a one-plate type, an adhesiveness of the vibration generating device 730 to the display panel 100 having a flexible characteristic may be reduced, and due to this, a vibration of the vibration generating device 730 may not be transferred to the display panel 100 and the harmonic vibration of the vibration generating device 730 may be limited, whereby the vibration characteristic similar to the vibration form (or motion) of the vibration generating device 730 may not be transferred to the display panel 100.

Each of the plurality of magnet plates 750a to 750c according to an embodiment may include a neodymium magnet having a relatively strong magnetic force (or ferromagnetism). For example, the neodymium magnet may include neodymium-iron-boron (Nd—Fe—B), but is not limited thereto.

According to another embodiment, each of the plurality of magnet plates 750a to 750c may use $Fe_2O_3$, $BaCO_3$, a neodymium magnet, strontium ferrite with improved magnet component, an alloy cast magnet including Al, nickel (Ni), and cobalt (Co), and/or the like, but is not limited thereto and may use a permanent magnet having a magnetic force.

A front surface (or a panel contact surface) of each of the plurality of magnet plates 750a to 750c may be covered by a coating layer 770 including a material having a relatively low friction coefficient. The coating layer 770 may be disposed on the front surface of each of the plurality of magnet plates 750a to 750c directly contacting the rear surface of the display panel 100, and thus, may decrease a friction force between each of the plurality of magnet plates 750a to 750c and the rear surface of the display panel 100 which is unfolded.

Figure 13:
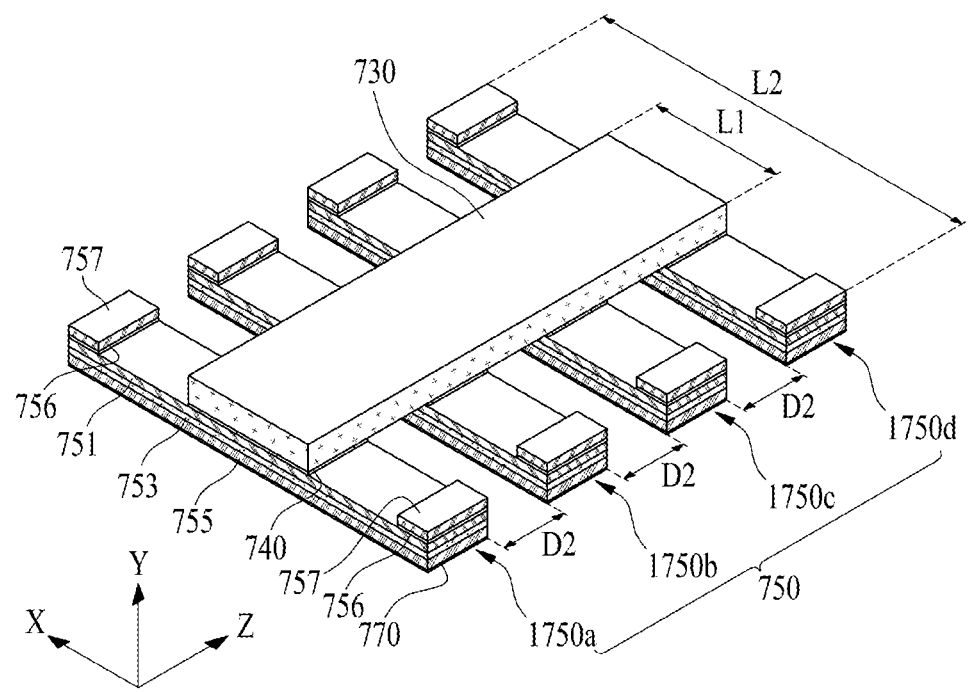
FIG. 13 illustrates a magnetic member according to another embodiment in a display apparatus according to an embodiment of the present disclosure.

FIG. 13 illustrates a magnetic member according to another embodiment in a display apparatus according to an embodiment of the present disclosure.

With reference to FIG. 13, the magnetic member 750 according to another embodiment may include a plurality of magnet wing parts 1750a, 1750b, 1750c, and 1750d.

Each of the plurality of magnet wing parts 1750a, 1750b, 1750c, and 1750d may be attached on a front surface of a vibration generating device 730 by an adhesive layer 740 to intersect the vibration generating device 730, and thus, may protrude in a direction toward each of both sides of the vibration generating device 730 along a first direction X. Therefore, each of the plurality of magnet wing parts 1750a, 1750b, 1750c, and 1750d may include a middle region attached on the vibration generating device 730 and a wing region which protrudes in the direction toward each of the both sides of the vibration generating device 730. Each of the plurality of magnet wing parts 1750a, 1750b, 1750c, and 1750d may have a second length L2 which is longer than a first length (or a width) L1 of the vibration generating device 730 with respect to the first direction X. Therefore, each of the plurality of magnet wing parts 1750a to 1750d and the vibration generating device 730 attached thereon by the adhesive layer 740 may one-dimensionally have a ╪ shape (e.g., a shape of a main line crossed with two other lines), but is not limited thereto.

The plurality of magnet wing parts 1750a, 1750b, 1750c, and 1750d may be arranged in parallel at a second interval D2 on a front surface of the vibration generating device 730, and thus, may increase an adhesiveness of the vibration generating device 730 to the display panel 100, thereby enabling a vibration of the vibration generating device 730 to be transferred to the display panel 100 without the loss of the vibration.

The middle region of each of the plurality of magnet wing parts 1750a, 1750b, 1750c, and 1750d may transfer the vibration of the vibration generating device 730 to the display panel 100.

The wing region of each of the plurality of magnet wing parts 1750a to 1750d may act as a mass which repeatedly vibrates based on inertia based on a vibration of the middle region. Also, the wing region of each of the plurality of magnet wing parts 1750a to 1750d may increase an inertia moment of the display panel 100 which vibrates based on a vibration of the vibration generating device 730 transferred thereto. For example, when the display panel 100 vibrates, the wing region of each of the plurality of magnet wing parts 1750a to 1750d may decrease a resonance frequency $f_0$ of the display panel 100 on the basis of weight m as in the following Equation (1), and thus, may increase a frequency characteristic of a low sound band of a panel vibration sound generated by the vibration of the display panel 100.

$$f_0 = \frac{1}{2\pi} \times \sqrt{\frac{s}{m}} \qquad \text{[Equation 1]}$$

In Equation (1), $f_0$ denotes a resonance frequency, s denotes stiffness, and m denotes weight (or mass).

Each of the plurality of magnet wing parts 1750a to 1750d according to an embodiment may include a metal bar 751 and a magnet bar 755. The metal bar 751 may be attached on the front surface of the vibration generating device 730 by an adhesive layer 740 to support the magnet bar 755. The metal bar 751 may have a second length L2 which is longer than a first length (or a width) L1 of the vibration generating device 730 with respect to a first direction X. Therefore, the metal bar 751 may include a middle region attached on the vibration generating device 730 and a wing region that protrudes in the direction toward each of both side surfaces of the vibration generating device 730. The metal bar 751 according to an embodiment may include a stainless material, an Al material, an Al alloy material, or a Mg alloy material, but is not limited thereto.

The magnet bar 755 may be attached on a front surface of the metal bar 751 by an adhesive layer 753. The magnet bar 755 may have the same width and length as those of the metal bar 751 and may have a thickness that is equal to or different from that of the metal bar 751. The magnet bar 755 may attach the vibration generating device 730 on the display panel 100 identically to the magnetic member 750 illustrated in FIGS. 8 and 9, and thus, its repetitive description is omitted.

A front surface (or a panel contact surface) of the magnet bar 755 may be covered by a coating layer 770 including a material having a relatively low friction coefficient. The coating layer 770 may be disposed on the front surface of the magnet bar 755 directly contacting the rear surface of the display panel 100, and thus, may decrease a friction force between the magnet bar 755 and the rear surface of the display panel 100 that is unfolded.

The magnet bar 755 may be directly attached on the front surface of the vibration generating device 730 by the adhesive layer 753. However, the magnet bar 755 may have low brittle, and thus, the wing region of the magnet bar 755 may be damaged when a vibration based on a vibration of the vibration generating device 730 is being performed. Accordingly, in the present disclosure, the magnet bar 755 may be attached on the metal bar 751, and thus, may increase brittle of the magnet bar 755, thereby preventing or reducing the magnet bar 755 from being damaged by a vibration.

Each of the plurality of magnet wing parts 1750a to 1750d according to an embodiment may further include a weight member 757.

The weight member 757 may be disposed on the wing region of the metal bar 751 with the vibration generating device 730 therebetween with respect to the first direction X. For example, the weight member 757 may be attached on an end of each of one portion and the other portion of the metal bar 751 by an adhesive layer 756. The weight member 757 may decrease a resonance frequency $f_0$ of each of the plurality of magnet wing parts 1750a to 1750d on the basis of weight as in Equation (1), and thus, may increase a sound characteristic of a low sound band based on a vibration of each of the plurality of magnet wing parts 1750a to 1750d.

The weight member 757 may include a metal material having a specific gravity of 5 or more. The weight member 757 according to an embodiment may include one of iridium (Ir), tungsten (W), platinum (Pt), gold (Au), iron (Fe), nickel (Ni), chromium (Cr), and copper (Cu) or an alloy of two or more materials thereof, but is not limited thereto. For example, the weight member 757 may include tungsten (W). A thickness (or weight) of the weight member 757 may be set based on the resonance frequency $f_0$ of each of the plurality of magnet wing parts 1750a to 1750d based on Equation (1) or a frequency characteristic of a panel vibration sound based on a vibration of the display panel 100.

Figure 14:
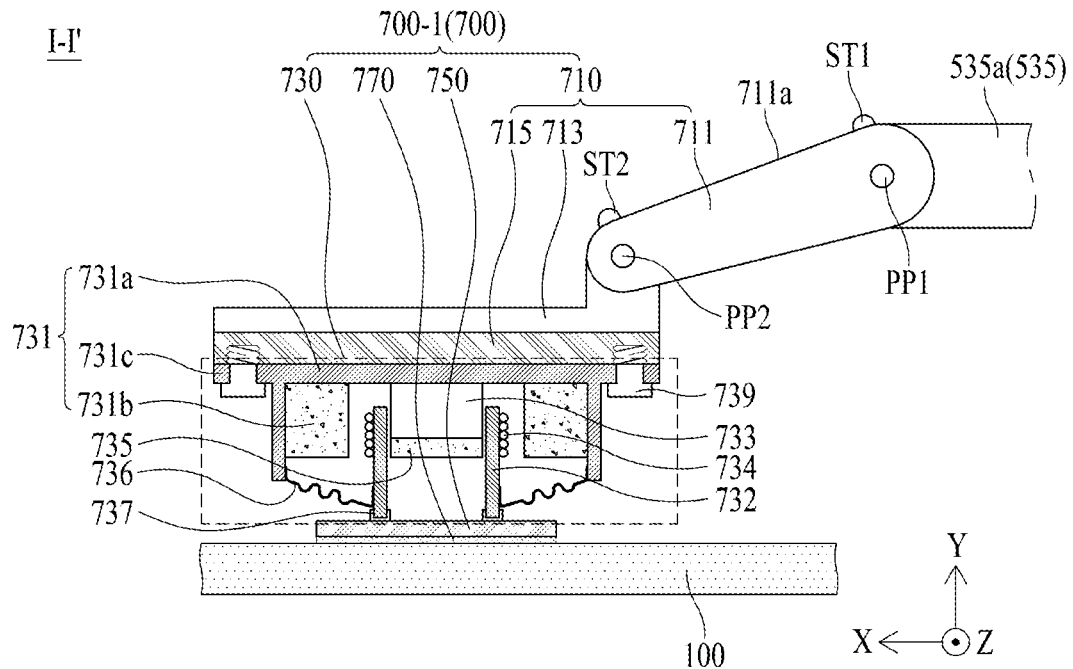
FIG. 14 is another cross-sectional view taken along line I-I' illustrated in FIG. 7.

FIG. 14 is another cross-sectional view taken along line I-I' illustrated in FIG. 7 and illustrates a vibration device according to another embodiment of the present disclosure. The vibration device according to another embodiment of the present disclosure illustrated in FIG. 14 may be configured by modifying a vibration generating device of a vibration module in a vibration device according to an embodiment of the present disclosure illustrated in FIGS. 7 and 8. In the following description, therefore, repetitive descriptions of elements other than a vibration generating device of a vibration device and relevant elements are omitted.

With reference to FIG. 14 in conjunction with FIG. 7, in the vibration device 700 according to another embodiment of the present disclosure, a vibration generating device 730 of a first vibration module 700-1 may include a module frame 731, a bobbin 732, a permanent magnet 733, a coil 734, a center pole 735, and a damper 736. The vibration generating device 730 having such a configuration may be referred to as a flat shape actuator or a thin actuator.

The module frame 731 may be coupled to a supporting bracket 715 of a module supporting member 710 facing a rear surface of a display panel 100. The module frame 731 according to an embodiment may include a frame body 731a, an upper plate 731b, and a frame fixing bracket 731c.

The frame body 731a may be disposed to overlap a rear surface of the supporting bracket 715. The frame body 731a may act as a lower plate supporting the permanent magnet 733.

The upper plate 731b may be disposed on a periphery of a front portion of the frame body 731a to have a cylindrical shape including a hollow portion. Therefore, the frame body 731a and the upper plate 731b may be provided as one body having a U-shape. The frame body 731a and the upper plate 731b are not limited to the term, and may be expressed using another term, such as a yoke.

The frame fixing bracket 731c may protrude from each of one portion and the other portion, which are parallel to each other, of the frame body 731a. The frame fixing bracket 731c may be coupled or connected to the supporting bracket 715 by a fastening member 739 such as a screw or a bolt. The fastening member 739 may pass through the frame fixing bracket 731c and may be fastened to the supporting bracket 715, thereby fixing the module frame 731 to the supporting bracket 715.

The bobbin 732 may include a hollow portion, therein and may vibrate in a direction toward the vibration plate. The bobbin 732 according to an embodiment may be provided in a ring-shape (or a cylindrical shape) including a hollow portion at a center thereof. For example, the bobbin 732 may be implemented as a ring-shaped (or cylindrical) structure formed of a material produced by processing pulp or paper, Al or Mg or an alloy thereof, synthetic resin such as polypropylene, or polyamide-based fiber. The bobbin 732 may vibrate, for example, perform a vertical reciprocating motion, based on a magnetic force.

The magnet member 733 may be disposed on the module frame 731 so as to be accommodated into the hollow portion of the bobbin 732. The permanent magnet 733 may have a cylindrical shape so as to be accommodated into the hollow portion of the bobbin 732. The permanent magnet 733 according to an embodiment may be implemented with a sintered magnet such as barium ferrite, and a material of the permanent magnet 733 may use $Fe_2O_3$, $BaCO_3$, a neodymium magnet, strontium ferrite with improved magnet component, an alloy cast magnet including Al, nickel (Ni), and cobalt (Co), and/or the like, but is not limited thereto. For example, the neodymium magnet may be neodymium-iron-boron (Nd—Fe—B).

The coil 734 may be wound to surround an outer circumference surface of a lower portion of the bobbin 732 and may be supplied with a sound signal (or a voice signal) from the outside. The coil 734 may move upward and downward along with the bobbin 732. Here, the coil 734 may be referred to as a voice coil. When a sound signal (or a current) is applied to the coil 734, a whole portion of the bobbin 732 may vibrate (for example, perform a vertical reciprocating motion) according to Fleming's left-hand law based on an application magnetic field generated around the coil 734 and an external magnetic field generated around the permanent magnet 733.

The center pole 735 may be disposed on the permanent magnet 733 and may guide a vibration of the bobbin 732. For example, the center pole 735 may be inserted into the hollow portion of the bobbin 732 having a cylindrical shape and may be surrounded by the bobbin 732. Here, the center pole 735 may be referred to as an elevation guider or pole pieces.

The damper 736 may be installed between the module frame 731 and the bobbin 732. For example, the damper 736 may be disposed between the frame body 731a of the module frame 731 and an outer circumference surface of an upper portion of the bobbin 732. The damper 736 may be referred to as a spider, a suspension, or an edge. The damper 736 may be provided in a structure that is creased between one end and the other end thereof, and may be contracted and relaxed based on a vibration of the bobbin 732 to control the vibration of the bobbin 732. For example, the damper 736 may be connected between the bobbin 732 and the module frame 731 and may limit a vibration distance of the bobbin 732 using a restoring force of the damper 736. For example, when the bobbin 732 moves by a certain distance or more or vibrates by a certain distance or less, the bobbin 732 may be restored to an original position with the restoring force of the damper 736.

The vibration generating device 730 of the first vibration module 700-1 according to the present embodiment may be implemented as an internal magnet type where the permanent magnet 733 is inserted into the hollow portion of the bobbin 732.

The vibration generating device 730 of the first vibration module 700-1 according to the present embodiment may be implemented as an external magnet type (or a dynamic type) where the permanent magnet 733 is disposed to surround an outer side of the bobbin 732. Here, except for that the permanent magnet 733 is provided between the lower plate 731a and the upper plate 731b and the center pole 735 is provided on the lower plate 731a so as to be inserted into the hollow portion of the bobbin 732, the vibration generating device 730 having the external magnet type is the same as the internal magnet type, and thus, its detailed description is omitted.

According to another embodiment of the present disclosure, the first vibration module 700-1 of the vibration device 700 may further include a bobbin protection member 737. The bobbin protection member 737 may be provided in a cylindrical shape including an opening which overlaps the hollow portion of the bobbin 732 and may be coupled or connected to an upper portion of the bobbin 732. The bobbin protection member 737 may cover the upper portion of the bobbin 732 to protect the bobbin 732, thereby preventing the bobbin 732 from being deformed by an external impact.

The bobbin protection member 737 according to an embodiment may be configured in a molding form of an injection material or metal. For example, the bobbin protection member 737 may include fiber reinforced plastics, composite resin including fiber reinforced plastics, or metal, and in this case, may perform a heat dissipation function of dissipating heat that occurs when the vibration generating device 730 is driven. The fiber reinforced plastics may be one of carbon fiber reinforced plastics (CFRP), glass fiber reinforced plastics (GFRP), graphite fiber reinforced plastics (GFRP), or a combination thereof, but the present embodiment is not limited thereto.

The bobbin protection member 737 according to an embodiment may be coupled to the bobbin 732 by a double-sided tape or adhesive resin. Here, the adhesive resin may be epoxy resin or acryl resin, but is not limited thereto.

In the vibration device 700 according to another embodiment of the present disclosure, a magnetic member 750 of the first vibration module 700-1 may be attached on the bobbin 732 of the vibration generating device 730 by an adhesive layer, or may be attached on the bobbin protection member 737 of the vibration generating device 730 by the adhesive layer. The magnetic member 750 may be attached on (or attracted to) an encapsulation substrate of the display panel 100 which is unfolded, and thus, may transfer a vibration of the vibration generating device 730 to an unfolded rear surface of the display panel 100.

In the vibration device 700 according to another embodiment of the present disclosure, the magnetic member 750 of the first vibration module 700-1 may be covered by a coating layer 770 including a material having a relatively low friction coefficient. The coating layer 770 may be disposed on the front surface of the magnetic member 750 directly contacting the rear surface of the display panel 100 as described above, and thus, may decrease a friction force between the magnetic member 750 and the rear surface of the display panel 100 which is unfolded.

In the vibration device 700 according to another embodiment of the present disclosure, each of the second to fourth vibration modules 700-2 to 700-4 illustrated in FIGS. 5 to 7 has the same or similar structure as that of the first vibration module 700-1, and thus, their repetitive descriptions are omitted.

The vibration device 700 according to another embodiment of the present disclosure may vibrate the unfolded display panel 100 using the vibration generating device 730 including a voice coil type actuator having a relatively good low sound output characteristic, thereby enhancing a low sound characteristic of a panel vibration sound of the display panel 100.

Figure 15:
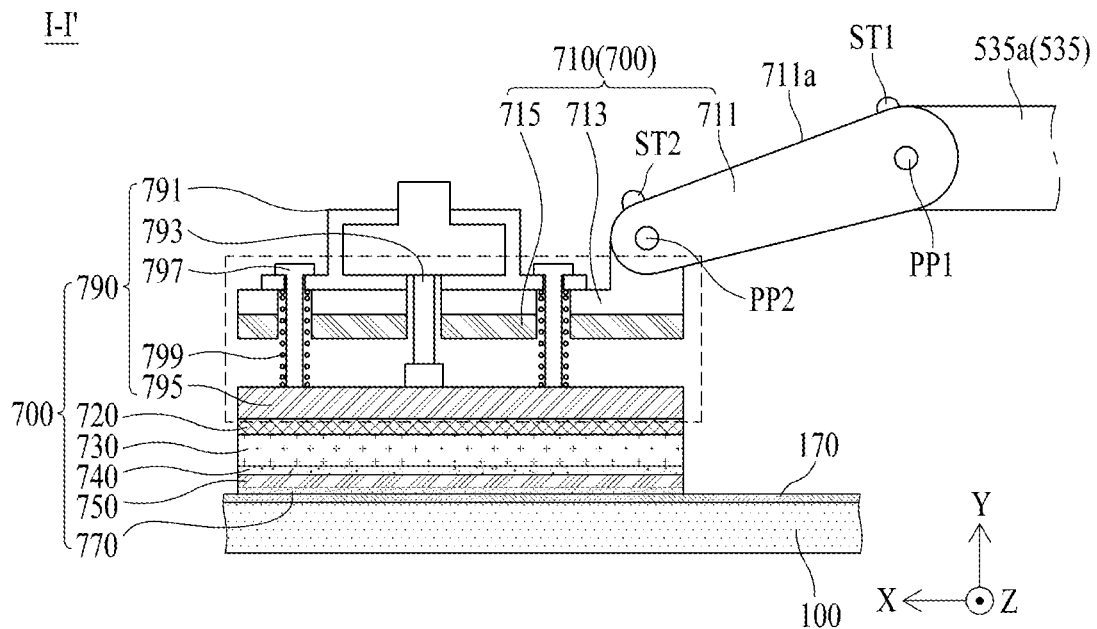
FIG. 15 is another cross-sectional view taken along line I-I' illustrated in FIG. 7.

FIG. 15 is another cross-sectional view taken along line I-I' illustrated in FIG. 7 and illustrates a vibration device according to another embodiment of the present disclosure. The vibration device according to another embodiment of the present disclosure illustrated in FIG. 15 may be configured by adding a movement module to the vibration module of the vibration device according to an embodiment of the present disclosure illustrated in FIGS. 7 and 8. In the following description, therefore, repetitive descriptions of elements other than an elevation module and relevant elements are omitted.

With reference to FIG. 15 in conjunction with FIG. 7, in the vibration device 700 according to another embodiment of the present disclosure, a first vibration module 700-1 may include a module supporting member 710, a movement module 790, a vibration generating device 730, and a magnetic member 750. The module supporting member 710, as described above, may include a first rotation link 711, a second rotation link 713, and a supporting bracket 715, and thus, like reference numerals refer to like elements and their repetitive descriptions are omitted.

The movement module 790 may be disposed on the module supporting member 710 and may rectilinearly move the vibration generating device 730 to the display panel 100. The movement module 790 according to an embodiment may be referred to as a linear solenoid or a linear solenoid actuator. The movement module 790 according to an embodiment may include a motor part 791, a movement shaft 793, a movement plate 795, a pair of movement guide shafts 797, and a pair of spring members 799.

The motor part 791 may be a body of the movement module 790 and may be disposed on the module supporting member 710 to rectilinearly move the movement shaft 793.

The motor part 791 may be fixed to the second rotation link 713 or the supporting bracket 715 of the module supporting member 710. The motor part 791 according to an embodiment may include a solenoid motor, but is not limited thereto.

The movement shaft 793 may be connected to the motor part 791 and may pass through the second rotation link 713 and the supporting bracket 715 of the module supporting member 710. The movement shaft 793 may rectilinearly move toward the display panel 100, based driving of the motor part 791. For example, the movement shaft 793 may move forward to the display panel 100 according to first-direction driving of the motor part 791 and may move backward to the display panel 100 according to second-direction driving of the motor part 791. For the rectilinear motion of the movement shaft 793, the module supporting member 710 may include a first shaft hole which is provided in the second rotation link 713 and the supporting bracket 715.

The movement plate 795 may be disposed to overlap the supporting bracket 715 of the module supporting member 710 and may be coupled or connected to the movement shaft 793 to support the vibration generating device 730. The movement plate 795 may rectilinearly move along with a rectilinear movement of the movement shaft 793 to rectilinearly move the vibration generating device 730.

The pair of movement guide shafts 797 may pass through the supporting bracket 715 of the module supporting member 710 and may be connected to the movement plate 795 to prevent the movement plate 795 from being tilted (or inclined), and thus, may maintain a flatness of the display panel 100, thereby enhancing adhesiveness between the vibration generating device 730 and the display panel 100. The pair of movement guide shafts 797 according to an embodiment may be arranged in parallel with the movement shaft 793 therebetween to pass through an edge of the motor part 791 and the supporting bracket 715 of the module supporting member 710 and may be connected to the movement plate 795.

The pair of spring members 799 may be disposed between the movement plate 795 and the periphery of the motor part 791 to surround the pair of movement guide shafts 797. The pair of spring members 799 may provide an elastic restoring force to the movement plate 795 to maintain a flatness of the movement plate 795, and thus, may maintain a flatness of the display panel 100, thereby preventing or reducing a vibration region of the display panel 100 from being roughed. Here, the pair of spring members 799 may be disposed between the movement plate 795 and the supporting bracket 715 of the module supporting member 710 to surround the pair of movement guide shafts 797.

The vibration generating device 730 may be attached on the movement plate 795 of the movement module 790 by an adhesive member 720. The vibration generating device 730 according to an embodiment, as illustrated in FIGS. 8 and 9, may be configured with a piezoelectric device including a piezoelectric material layer, and its repetitive description is omitted. According to another embodiment, the vibration generating device 730 may be configured with a flat actuator or a thin actuator each using the voice coil illustrated in FIG. 14, and its repetitive description is omitted.

The magnetic member 750 may be attached on a front surface of the vibration generating device 730 by an adhesive layer 740. The magnetic member 750 may be attached on (or attracted to) an encapsulation substrate of the display panel 100 which is unfolded, based on a rectilinear movement of the movement module 790, and thus, may transfer a vibration of the vibration generating device 730 to an unfolded rear surface of the display panel 100. The magnetic member 750 may act as a vibration transfer medium which transfers the vibration of the vibration generating device 730 to the display panel 100. For example, the magnetic member 750 according to the present embodiment may move forward according to first-direction driving of the movement module 790 and may be attached on the display panel 100, and moreover, the magnetic member 750 may move backward according to second-direction driving of the movement module 790 and may be detached (or separated) from the display panel 100.

The magnetic member 750 according to an embodiment may be configured with one magnet plate (or a magnetic force plate) which has the same size as that of the front surface of the vibration generating device 730 and is attached on the front surface of the vibration generating device 730.

According to another embodiment, as illustrated in FIG. 12, the magnetic member 750 may include a plurality of magnet plates 750a to 750c which are arranged in parallel at a first interval or distance D1 on the front surface of the vibration generating device 730.

According to another embodiment of the present disclosure, as illustrated in FIG. 13, the magnetic member 750 may include a plurality of magnet wing parts 1750a to 1750d which are arranged in parallel at a second interval or distance D2 on the front surface of the vibration generating device 730.

A front surface (or a panel contact surface) of the magnetic member 750 according to the present embodiment may be covered by a coating layer 770 including a material having a relatively low friction coefficient. The coating layer 770 may be disposed on the front surface of the magnetic member 750 directly contacting the rear surface of the display panel 100, and thus, may decrease a friction force between the magnetic member 750 and the rear surface of the display panel 100 which is unfolded.

In the vibration device 700 according to another embodiment of the present disclosure, each of the second to fourth vibration modules 700-2 to 700-4 illustrated in FIGS. 5 to 7 has the same structure as that of the above-described first vibration module 700-1, and thus, their repetitive descriptions are omitted.

When the display panel 100 is wound or unwound based on winding driving or unwinding driving of the rolling module 500, the vibration device 700 according to the present embodiment may be detached and separated from the display panel 100, and thus, may not hinder winding or unwinding of the display panel 100. On the other hand, when entire the display panel 100 or some portion of the display panel 100 is unfolded based on unwinding driving of the rolling module 500, the vibration device 700 according to the present embodiment may contact the display panel 100 and may vibrate the unfolded display panel 100. Accordingly, a panel vibration sound of the display panel 100 may be output in a direction in which a user or a viewer is located, thereby enhancing immersion experience of the viewer or the user in a displayed image and a sound.

Moreover, the vibration device 700 according to the present embodiment may be applied to the display panel 100 which includes a plate (or a sheet) 170 for preventing the display panel 100 from being damaged by particles in unwinding of the display panel 100. For example, the plate 170 may be a metal mesh plate, but is not limited thereto. The plate 170 may include a plurality of cut portions (or slits) and may be attached on a rear surface of the display panel 100 which selectively contacts the vibration device 700. For example, due to the plate 170, the vibration device 700 may not slide (or move) with the vibration device 700 being attached on the rear surface of the display panel 100 in winding or unwinding of the display panel 100. Therefore, each vibration module of the vibration device 700 according to the present embodiment may be detached from the rear surface of the display panel 100 according to second-direction driving of the movement module 790 during winding or unwinding of the display panel 100, and when unwinding of the display panel 100 ends, each vibration module of the vibration device 700 may be attached on the rear surface of the display panel 100 according to first-direction driving of the movement module 790.

Figure 16:
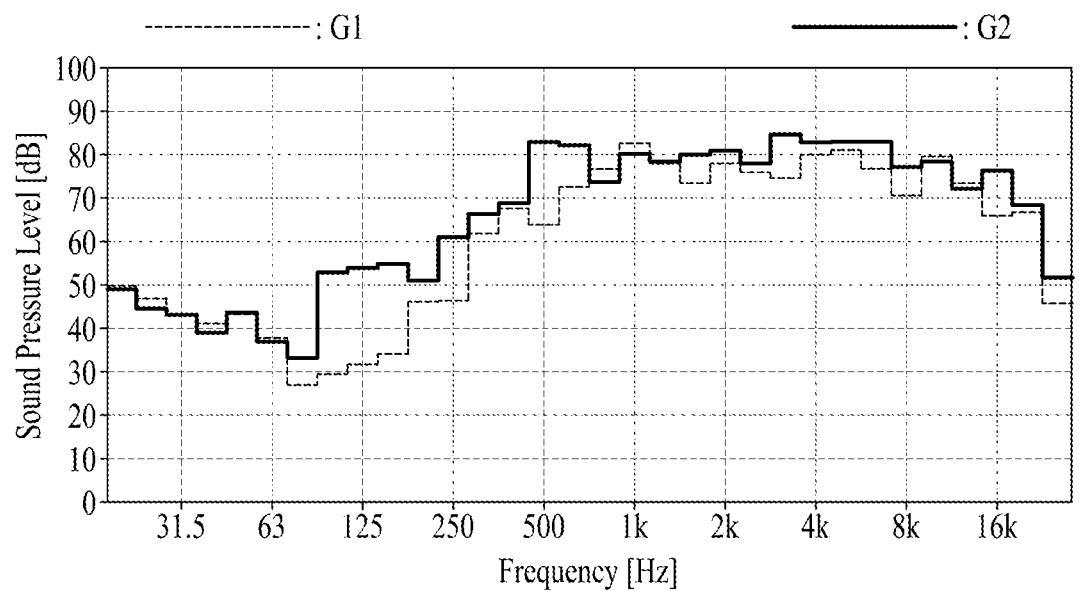
FIG. 16 is a graph showing a sound output characteristic of a display apparatus according to a comparative example and a sound output characteristic of a display apparatus according to an embodiment of the present disclosure.

FIG. 16 is a graph showing experimental results of a sound output characteristic of a display apparatus according to a comparative example and a sound output characteristic of a display apparatus according to an embodiment of the present disclosure. In FIG. 16, a dotted-line graph G1 according to the comparative example shows a sound output characteristic of a display panel with respect to a vibration of a vibration generating device attached on the display panel by a double-sided tape. A solid-line graph G2 according to an embodiment of the present disclosure shows a sound output characteristic of a display panel with respect to a vibration of a vibration generating device attached on the display panel by a magnetic member. In experiments performed on the comparative example and an embodiment of the present disclosure, a piezoelectric device has been used as a vibration generating device. In FIG. 16, the abscissa axis represents a frequency (Hz), and the ordinate axis represents a sound pressure level (dB). Here, the sound output characteristics have been measured using sound analysis equipment.

As shown in FIG. 16, in comparison with a display apparatus according to the comparative example, it may be seen that a display apparatus according to an embodiment of the present disclosure has an enhanced sound pressure level at a frequency band of about 70 Hz to about 20 kHz. Therefore, in embodiments according to the present disclosure, because the vibration generating device is attached on the display panel by the magnetic member, the display panel may vibrate even without using a double-sided tape or an adhesive, and the display apparatus may output a sound using a vibration of the display panel.

Figure 17:
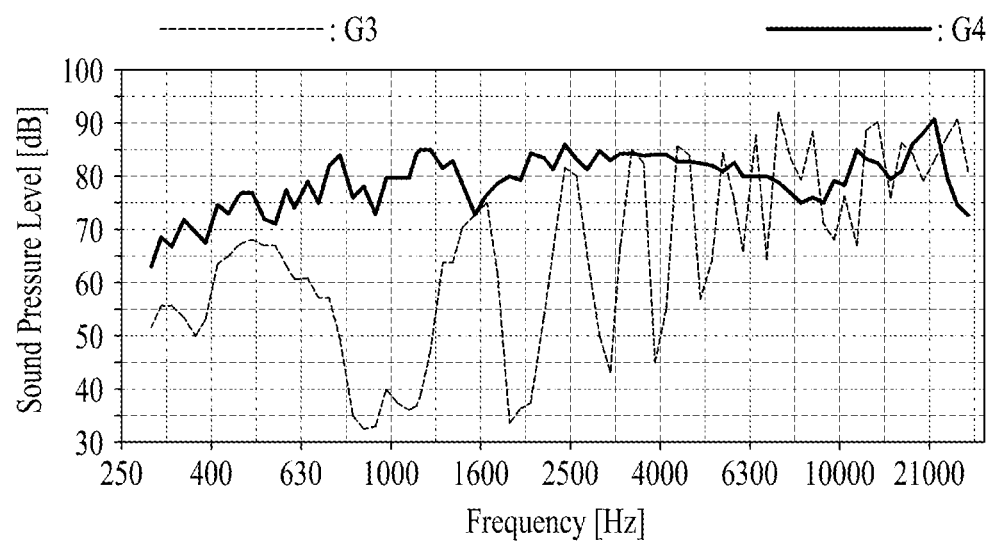
FIG. 17 is a graph showing a sound output characteristic of a display apparatus according to an embodiment of the present disclosure and a sound output characteristic of a display apparatus according to another embodiment of the present disclosure.

FIG. 17 is a graph showing experimental results of a sound output characteristic of a display apparatus according to an embodiment of the present disclosure and a sound output characteristic of a display apparatus according to another embodiment of the present disclosure. In FIG. 17, a dotted-line graph G3 according to an embodiment of the present disclosure shows a sound output characteristic of a display panel with respect to a vibration of a vibration generating device attached on the display panel by a magnetic member including one magnet plate illustrated in FIG. 8. A solid-line graph G4 according to another embodiment of the present disclosure shows a sound output characteristic of a display panel with respect to a vibration of a vibration generating device attached on the display panel by a magnetic member including a plurality of magnet plates illustrated in FIG. 12. In experiments performed on an embodiment of the present disclosure and another embodiment of the present disclosure, a piezoelectric device has been used as a vibration generating device. In FIG. 17, the abscissa axis represents a frequency (Hz), and the ordinate axis represents a sound pressure level (dB). Here, the sound output characteristics have been measured using sound analysis equipment.

As shown in FIG. 17, in comparison with the display apparatus according to an embodiment of the present disclosure, it may be seen that the display apparatus according to an embodiment of the present disclosure has an enhanced and uniform sound pressure level at a frequency band of about 300 Hz to about 20 kHz.

A display apparatus according to the present disclosure will be described below.

A display apparatus according to an embodiment of the present disclosure may comprise a display panel including a plurality of pixels and configured to display an image; a housing module including a roller therein such that the display panel is configured to be wound on the roller to be housed in the housing module or unwound from the roller to extend from the housing module; a rolling module including a structure connected to the display panel and configured to wind or unwind the display panel according to a folding or unfolding of the structure; and a vibration device on the structure, the vibration device configured to vibrate the display panel in an unwound state.

In the display apparatus according to the present disclosure, the rolling module may further comprise a supporting frame configured to support an upper portion of the display panel; and a driver disposed in the housing module. The structure may be connected between the supporting frame and the driver, may be configured to be folded or unfolded according to a driving of the driver.

In the display apparatus according to the present disclosure, the structure may comprise a first link part including a first portion connected to the supporting frame; a second link part including a first portion connected to the driver; and a link connection part rotatably supporting each of a second portion of the first link part and a second portion of the second link part. The vibration device may be on the link connection part.

In the display apparatus according to the present disclosure, the vibration device may comprise a vibration module on the link connection part. Further, the vibration module may comprise a module supporting member rotatably connected to the link connection part; a vibration generating device on the module supporting member; and a magnetic member on the vibration generating device.

In the display apparatus according to the present disclosure, the magnetic member may comprise a coating layer on a contact surface thereof contacting the display panel when the structure is unfolded. Further, structure may comprise a first structure and a second structure arranged parallel to each other, and each of the first and second structures may be connected between the supporting frame and the driver. Each of the first structure and the second structure may comprise a first link part including a first portion connected to the supporting frame; a second link part including a first portion connected to the driver; and a link connection part rotatably supporting each of a second portion of the first link part and a second portion of the second link part. The vibration device may be on the link connection part.

In the display apparatus according to the present disclosure, the vibration device may comprise a first vibration module rotatably connected to the link connection part of the first structure; a second vibration module rotatably connected to the link connection part of the first structure; a third vibration module rotatably connected to the link connection part of the second structure; and a fourth vibration module rotatably connected to the link connection part of the second structure.

In the display apparatus according to the present disclosure, the first vibration module may be configured to move in a rectilinear direction according to the folding and unfolding of the first structure and the second vibration module may be configured to move in a diagonal direction according to the folding and unfolding of the first structure. The third vibration module may be configured to move in a rectilinear direction according to the folding and unfolding of the second structure and the fourth vibration module may be configured to move in a diagonal direction according to the folding and unfolding of the second structure.

In the display apparatus according to the present disclosure, one of or each of the first to fourth vibration modules may comprise a module supporting member rotatably connected to the structure; a vibration generating device on the module supporting member; and a magnetic member on the vibration generating device. Additionally, the magnetic member may comprise a coating layer on a contact surface thereof contacting the display panel when the structure is unfolded. Moreover, the magnetic member may comprise one magnet plate on the vibration generating device. Also, the magnetic member may comprise a plurality of magnet plates spaced apart from each other on the vibration generating device. The magnetic member may comprise a plurality of magnet wing parts spaced apart from each other and respectively protruding laterally from the vibration generating device. Each of the plurality of magnet wing parts comprise a metal bar including a middle region on the vibration generating device and a wing region protruding laterally from the vibration generating device; and a magnet bar connected to the metal bar. Each of the plurality of magnet wing parts may further comprise a weight member on the wing region of the metal bar. The vibration generating device may comprise a piezoelectric device including a piezoelectric material layer.

In the display apparatus according to the present disclosure, the vibration device may comprise a vibration module. The vibration module may comprise a module supporting member rotatably connected to the structure; a vibration generating device on the module supporting member; and a magnetic member on the vibration generating device. The vibration module may further comprise an air gap between the module supporting member and the vibration generating device. The display apparatus may further comprise a plate on a rear surface of the display panel and having a plurality of slits.

A display apparatus according to an embodiment of the present disclosure may comprise a display panel including a plurality of pixels and configured to display an image; a housing module for accommodating the display panel in a rolled-up state, the housing module including a roller prat configured to allow the display panel to be rolled-up thereon; a rolling module including at least one structure connected to the display panel and configured to unroll the display panel according to unfolding of the at least one structure; and a vibration device on the at least one structure, the vibration device configured to vibrate the display panel in an unrolled state, wherein the vibration device includes a vibration generating device and a plurality of magnetic plates on the vibration generating device.

In the display apparatus according to the present disclosure, the vibration device may further comprise a module supporting member rotatably connected to the structure; and an air gap between the module supporting member and the vibration generating device.

In the display apparatus according to the present disclosure, the plurality of magnetic plates may be spaced apart from each other. Further, each of the plurality of magnetic plates may comprise a coating layer on a contact surface thereof contacting the unrolled display panel. The coating layer may comprise a material having a friction coefficient of 0.05 to 0.5. The vibration device may be configured to be spaced apart from the display panel when the display panel is being rolled or unrolled, and the vibration device may contact the display panel when the display panel is in the unrolled state. The vibration device may further comprise a movement module configured to move the vibration generating device towards the display panel being in the unrolled state.

In the display apparatus according to the present disclosure, the at least one may comprise a first structure and a second structure arranged in parallel and the vibration device may comprise at least four vibration modules and a first vibration module and a second vibration module of the at least four vibration modules may be rotatably connected to the first structure and a third vibration module and a fourth vibration module of the at least four vibration modules may be rotatably connected to the second structure. The first vibration module may be configured to move in a rectilinear direction and the second vibration module may be configured to move in a diagonal direction according to the folding and unfolding of the first structure, and the third vibration module may be configured to move in a rectilinear direction and the fourth vibration module may be configured to move in a diagonal direction according to the folding and unfolding of the second structure.

In the display apparatus according to the present disclosure, the roller part of the housing module may include roller, on which the display panel is wound in the rolled-up state, a shaft rotatably supporting the roller, and an elastic member connected between the roller and the shaft and con-figured to provide a restoring force for rolling-up the display panel.

In the display apparatus according to the present disclosure, the at least one structure may be accommodated in the housing module when being in a folded state and the at least one structure may extend from the housing module when being in an unfolded state.

It will be apparent to those skilled in the art that various modifications and variations can be made in the display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:
1. A display apparatus, comprising:
a display panel including a plurality of pixels and configured to display an image;
a housing module including a roller therein such that the display panel is configured to be wound on the roller to be housed in the housing module or unwound from the roller to extend from the housing module;
a rolling module including a structure connected to the display panel and configured to wind or unwind the display panel according to a folding or unfolding of the structure; and a vibration device on the structure, the vibration device configured to vibrate the display panel in an unwound state, wherein the structure includes a first link part, a second link part, and a link connection part rotatably supporting each of the first link part and the second link part, and wherein the vibration device is rotatably connected to the link connection part.

2. The display apparatus of claim 1, wherein the rolling module further comprises:
a supporting frame configured to support an upper portion of the display panel; and
a driver in the housing module, and
wherein the structure is connected between the supporting frame and the driver, is configured to be folded or unfolded according to a driving of the driver.

3. The display apparatus of claim 2, wherein
the first link part includes a first portion rotatably connected to the supporting frame and a second portion rotatably connected to the link connection part;
the second link part includes a first portion rotatably connected to the driver and a second portion rotatably connected to the link connection part; and
the link connection part rotatably supports each of the second portion of the first link part and the second portion of the second link part.

4. The display apparatus of claim 1, wherein the vibration device comprises a vibration module on the link connection part, and
wherein the vibration module comprises:
a module supporting member rotatably connected to the link connection part;
a vibration generating device on the module supporting member; and
a magnetic member on the vibration generating device.

5. The display apparatus of claim 4, wherein the magnetic member comprises a coating layer on a contact surface thereof contacting the display panel when the structure is unfolded.

6. The display apparatus of claim 3, wherein the structure comprises a first structure and a second structure arranged parallel to each other, and each of the first and second structures is connected between the supporting frame and the driver,
wherein each of the first structure and the second structure comprises
the first link part, the second link part, and the link connection part, and
wherein the vibration device is rotatably connected to the link connection part of the each of the first structure and the second structure, respectively.

7. The display apparatus of claim 6, wherein the vibration device comprises:
a first vibration module rotatably connected to the link connection part of the first structure;
a second vibration module rotatably connected to the link connection part of the first structure;
a third vibration module rotatably connected to the link connection part of the second structure; and
a fourth vibration module rotatably connected to the link connection part of the second structure.

8. The display apparatus of claim 7, wherein the first vibration module is configured to move in a rectilinear direction according to the folding and unfolding of the first structure, and the second vibration module is configured to move in a diagonal direction according to the folding and unfolding of the first structure, and wherein the third vibration module is configured to move in a rectilinear direction according to the folding and unfolding of the second structure, and the fourth vibration module is configured to move in a diagonal direction according to the folding and unfolding of the second structure.

9. The display apparatus of claim 7, wherein one of or each of the first to fourth vibration modules comprises:
a module supporting member rotatably connected to the structure;
a vibration generating device on the module supporting member; and
a magnetic member on the vibration generating device.

10. The display apparatus of claim 9, wherein the magnetic member comprises a coating layer on a contact surface thereof contacting the display panel when the structure is unfolded.

11. The display apparatus of claim 4, wherein the magnetic member comprises one magnet plate on the vibration generating device.

12. The display apparatus of claim 4, wherein the magnetic member comprises a plurality of magnet plates spaced apart from each other in the vibration generating device.

13. The display apparatus of claim 4, wherein the magnetic member comprises a plurality of magnet wing parts spaced apart from each other and respectively protruding laterally from the vibration generating device.

14. The display apparatus of claim 13, wherein each of the plurality of magnet wing parts comprises:
a metal bar including a middle region on the vibration generating device and a wing region protruding laterally from the vibration generating device; and
a magnet bar connected to the metal bar.

15. The display apparatus of claim 14, wherein each of the plurality of magnet wing parts further comprises a weight member on the wing region of the metal bar.

16. The display apparatus of claim 4, wherein the vibration generating device comprises a piezoelectric device including a piezoelectric material layer.

17. The display apparatus of claim 1, wherein the vibration device comprises a vibration module, and
wherein the vibration module comprises:
a module supporting member rotatably connected to the structure;
a vibration generating device on the module supporting member; and
a magnetic member on the vibration generating device.

18. The display apparatus of claim 17, wherein the vibration module further comprises an air gap between the module supporting member and the vibration generating device.

19. The display apparatus of claim 1, further comprising a plate on a rear surface of the display panel and having a plurality of slits.

20. A display apparatus, comprising:
a display panel including a plurality of pixels and configured to display an image;
a housing module for accommodating the display panel in a rolled-up state, the housing module including a roller part configured to allow the display panel to be rolled-up thereon;
a rolling module including at least one structure connected to the display panel and configured to unroll the display panel according to unfolding of the at least one structure; and a vibration device on the at least one structure, the vibration device configured to vibrate the display panel un an unrolled state, wherein the vibration device includes a vibration generating device and a plurality of magnetic plates on the vibration generating device, wherein the at least one structure includes a first link part, a second link part, and a link connection part rotatably supporting each of the first link part and the second link part, and wherein the vibration device is rotatably connected to the link connection part.

21. The display apparatus of claim 20, wherein the vibration device further comprises:

a module supporting member rotatably connected to the structure; and an air gap between the module supporting member and the vibration generating device.

22. The display apparatus of claim 20, wherein the plurality of magnetic plates are spaced apart from each other.

23. The display apparatus of claim 20, wherein each of the plurality of magnetic plates comprises a coating layer on a contact surface thereof contacting the unrolled display panel.

24. The display apparatus of claim 23, wherein the coating layer comprises a material having a friction coefficient of 0.05 to 0.5.

25. The display apparatus of claim 20, wherein the vibration device is configured to be spaced apart from the display panel when the display panel is being rolled or unrolled, and the vibration device contacts the display panel when the display panel is in the unrolled state.

26. The display apparatus of claim 20, wherein the vibration device further comprises a movement module configured to move the vibration generating device towards the display panel being in the unrolled state.

27. The display apparatus of claim 20, wherein the rolling module further comprises a supporting frame configured to support an upper portion of the display panel and a driver in the housing module, wherein the at least one structure comprises a first structure and a second structure arranged in parallel between the supporting frame and the driver and the vibration device comprises at least four vibration modules, and where each of the first structure and the second structure is configured to be folded or unfolded according to a driving of the driver and comprises the first link part, the second link part, and the link connection part, wherein a first vibration module and a second vibration module of the at least four vibration modules are rotatably connected to the link connection part of the first structure and a third vibration module and a fourth vibration module of the at least four vibration modules are rotatably connected to the link connection part of the second structure.

28. The display apparatus of claim 27, wherein the first vibration module is configured to move in a rectilinear direction and the second vibration module is configured to move in a diagonal direction according to the folding and unfolding of the first structure, and wherein the third vibration module is configured to move in a rectilinear direction and the fourth vibration module is configured to move in a diagonal direction according to the folding and unfolding of the second structure.

29. The display apparatus of claim 20, wherein the roller part of the housing module includes:

a roller, on which the display panel is wound in the rolled-up state;

a shaft rotatably supporting the roller; and an elastic member connected between the roller and the shaft and con-figured to provide a restoring force for rolling-up the display panel.

30. The display apparatus of claim 20, wherein the at least one structure is accommodated in the housing module when being in a folded state, and wherein the at least one structure extends from the housing module when being in an unfolded state.

* * * * *